US010395547B2

(12) United States Patent
Kobayashi

(10) Patent No.: US 10,395,547 B2
(45) Date of Patent: Aug. 27, 2019

(54) SUPPORTING POPULARIZATION OF INFORMATION AND COMMUNICATIONS TECHNOLOGY IN THE FIELD OF EDUCATION

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 14/403,712

(22) PCT Filed: May 22, 2013

(86) PCT No.: PCT/JP2013/064235
§ 371 (c)(1),
(2) Date: Nov. 25, 2014

(87) PCT Pub. No.: WO2013/179982
PCT Pub. Date: Dec. 5, 2013

(65) Prior Publication Data

US 2015/0140540 A1 May 21, 2015

(30) Foreign Application Priority Data

May 30, 2012 (JP) ................................ 2012-123803

(51) Int. Cl.
*G06F 1/32* (2019.01)
*G06F 17/30* (2006.01)
(Continued)

(52) U.S. Cl.
CPC .............. *G09B 5/12* (2013.01); *G06Q 50/20* (2013.01); *G09B 19/00* (2013.01); *H04L 67/025* (2013.01);
(Continued)

(58) Field of Classification Search
CPC ...................................................... G09B 19/00
(Continued)

(56) References Cited

U.S. PATENT DOCUMENTS 5,475,706 A * 12/1995 Kobayashi ............ H04J 3/0629 370/474
5,726,984 A * 3/1998 Kubler et al. .......... H04L 69/18
(Continued)

FOREIGN PATENT DOCUMENTS

JP 2002-010360 A 1/2002
JP 2007-108804 A 4/2007
(Continued)

OTHER PUBLICATIONS

Extended European Search Report corresponding to European Application No. 13797219.6, dated Nov. 30, 2015, 7 pages.
(Continued)

*Primary Examiner* — Thomas J Hong
(74) *Attorney, Agent, or Firm* — Wilmer Cutler Pickering Hale and Dorr LLP

(57) ABSTRACT

There is provided an information processing apparatus that readily supports to provide hardware resources for implementing ICT education in the field of education. The information processing apparatus includes a device information receiver that receives, via a network, device information for identifying a device connected to a portable terminal, an education application selector that selects, based on the device information, an education application to be provided to the device, and an education application provider that provides the education application to the device via the network and the portable terminal.

13 Claims, 33 Drawing Sheets

(51) Int. Cl.

| | |
|---|---|
| ***G06F 3/12*** | (2006.01) |
| ***H04J 3/06*** | (2006.01) |
| ***H04L 12/28*** | (2006.01) |
| ***H04L 12/64*** | (2006.01) |
| ***H04L 12/801*** | (2013.01) |
| ***H04L 12/851*** | (2013.01) |
| ***H04L 29/06*** | (2006.01) |
| ***H04L 29/08*** | (2006.01) |
| ***H04L 29/12*** | (2006.01) |
| ***H04W 8/22*** | (2009.01) |
| ***H04W 24/00*** | (2009.01) |
| ***G09B 5/12*** | (2006.01) |
| ***G09B 19/00*** | (2006.01) |
| ***G06Q 50/20*** | (2012.01) |
| *G05B 15/02* | (2006.01) |
| *G05B 19/409* | (2006.01) |
| *G06F 1/28* | (2006.01) |
| *G06F 1/3287* | (2019.01) |
| *G06F 1/3234* | (2019.01) |
| *G06F 3/00* | (2006.01) |
| *G06F 3/01* | (2006.01) |
| *G06F 1/3209* | (2019.01) |
| *G06F 3/038* | (2013.01) |
| *G06F 3/0488* | (2013.01) |
| *G06F 3/03* | (2006.01) |
| *G06F 3/14* | (2006.01) |
| *G06F 9/445* | (2018.01) |
| *G06F 3/16* | (2006.01) |
| *G06F 8/61* | (2018.01) |
| *G06F 9/4401* | (2018.01) |
| *G06F 13/38* | (2006.01) |
| *G06F 9/54* | (2006.01) |
| *G06F 13/10* | (2006.01) |
| *G06F 11/14* | (2006.01) |
| *G06F 17/50* | (2006.01) |
| *G09G 5/00* | (2006.01) |
| *G09B 21/00* | (2006.01) |
| *G09G 5/12* | (2006.01) |
| *H04L 1/16* | (2006.01) |
| *H04L 12/18* | (2006.01) |
| *H04L 12/40* | (2006.01) |
| *H04L 12/46* | (2006.01) |
| *H04L 12/24* | (2006.01) |
| *H04L 12/701* | (2013.01) |
| *H04L 12/803* | (2013.01) |
| *H04L 12/853* | (2013.01) |
| *H04L 12/859* | (2013.01) |
| *H04L 12/863* | (2013.01) |
| *H04L 12/919* | (2013.01) |
| *H04L 12/911* | (2013.01) |
| *H04L 12/927* | (2013.01) |
| *H04L 12/861* | (2013.01) |
| *H04L 12/58* | (2006.01) |
| *H04W 4/00* | (2018.01) |
| *H04W 4/18* | (2009.01) |
| *H04W 4/02* | (2018.01) |
| *H04W 4/06* | (2009.01) |
| *H04W 4/50* | (2018.01) |
| *H04W 8/18* | (2009.01) |
| *H04W 4/70* | (2018.01) |
| *H04W 8/06* | (2009.01) |
| *H04W 4/80* | (2018.01) |
| *H04W 12/06* | (2009.01) |
| *H04W 12/08* | (2009.01) |
| *H04W 12/02* | (2009.01) |
| *H04W 8/26* | (2009.01) |
| *H04W 24/04* | (2009.01) |
| *H04W 28/06* | (2009.01) |
| *H04W 28/14* | (2009.01) |
| *H04W 28/26* | (2009.01) |
| *H04W 36/08* | (2009.01) |
| *H04W 36/14* | (2009.01) |
| *H04W 36/30* | (2009.01) |
| *H04W 28/24* | (2009.01) |
| *H04W 40/28* | (2009.01) |
| *H04W 40/24* | (2009.01) |
| *H04W 40/12* | (2009.01) |
| *H04W 40/06* | (2009.01) |
| *H04W 36/32* | (2009.01) |
| *H04W 48/06* | (2009.01) |
| *H04W 48/08* | (2009.01) |
| *H04W 48/20* | (2009.01) |
| *H04W 48/16* | (2009.01) |
| *H04W 48/18* | (2009.01) |
| *H04W 72/04* | (2009.01) |
| *H04W 72/06* | (2009.01) |
| *H04W 52/02* | (2009.01) |
| *H04W 56/00* | (2009.01) |
| *H04W 64/00* | (2009.01) |
| *H04W 72/12* | (2009.01) |
| *H04W 80/00* | (2009.01) |
| *H04W 74/00* | (2009.01) |
| *H04W 76/10* | (2018.01) |
| *H04W 84/04* | (2009.01) |
| *H04W 84/18* | (2009.01) |
| *H04W 84/12* | (2009.01) |
| *H04W 88/04* | (2009.01) |
| *H04W 88/02* | (2009.01) |
| *H04W 88/06* | (2009.01) |
| *H04W 88/08* | (2009.01) |
| *H04W 92/20* | (2009.01) |
| *H04W 92/10* | (2009.01) |
| *G06F 16/27* | (2019.01) |
| *G06F 16/28* | (2019.01) |
| *G06F 16/583* | (2019.01) |

(52) U.S. Cl.

CPC ............ *G05B 15/02* (2013.01); *G05B 19/409* (2013.01); *G05B 2219/36159* (2013.01); *G05B 2219/40174* (2013.01); *G06F 1/28* (2013.01); *G06F 1/325* (2013.01); *G06F 1/3209* (2013.01); *G06F 1/3287* (2013.01); *G06F 3/005* (2013.01); *G06F 3/011* (2013.01); *G06F 3/0304* (2013.01); *G06F 3/0383* (2013.01); *G06F 3/04886* (2013.01); *G06F 3/122* (2013.01); *G06F 3/1204* (2013.01); *G06F 3/1206* (2013.01); *G06F 3/1228* (2013.01); *G06F 3/1247* (2013.01); *G06F 3/1289* (2013.01); *G06F 3/1292* (2013.01); *G06F 3/14* (2013.01); *G06F 3/167* (2013.01); *G06F 8/61* (2013.01); *G06F 9/445* (2013.01); *G06F 9/4411* (2013.01); *G06F 9/54* (2013.01); *G06F 11/1443* (2013.01); *G06F 13/102* (2013.01); *G06F 13/385* (2013.01); *G06F 16/27* (2019.01); *G06F 16/282* (2019.01); *G06F 16/5838* (2019.01); *G06F 17/5068* (2013.01); *G06F 17/5081* (2013.01); *G06F 2203/0381* (2013.01); *G06F 2209/549* (2013.01); *G06F 2213/0058* (2013.01); *G09B 21/005* (2013.01); *G09G 5/005* (2013.01); *G09G 5/12* (2013.01);

G09G 2360/02 (2013.01); G09G 2370/022 (2013.01); G09G 2370/06 (2013.01); G09G 2370/16 (2013.01); G09G 2370/20 (2013.01); H04J 3/0602 (2013.01); H04J 3/0629 (2013.01); H04J 3/0641 (2013.01); H04L 1/16 (2013.01); H04L 12/18 (2013.01); H04L 12/1818 (2013.01); H04L 12/28 (2013.01); H04L 12/2856 (2013.01); H04L 12/2898 (2013.01); H04L 12/40032 (2013.01); H04L 12/40169 (2013.01); H04L 12/467 (2013.01); H04L 12/4625 (2013.01); H04L 29/06 (2013.01); H04L 29/06027 (2013.01); H04L 29/1216 (2013.01); H04L 29/12047 (2013.01); H04L 29/12066 (2013.01); H04L 29/12254 (2013.01); H04L 29/12301 (2013.01); H04L 29/12924 (2013.01); H04L 41/00 (2013.01); H04L 45/00 (2013.01); H04L 47/10 (2013.01); H04L 47/11 (2013.01); H04L 47/122 (2013.01); H04L 47/14 (2013.01); H04L 47/15 (2013.01); H04L 47/19 (2013.01); H04L 47/2408 (2013.01); H04L 47/2416 (2013.01); H04L 47/2433 (2013.01); H04L 47/2441 (2013.01); H04L 47/2475 (2013.01); H04L 47/29 (2013.01); H04L 47/50 (2013.01); H04L 47/6215 (2013.01); H04L 47/70 (2013.01); H04L 47/767 (2013.01); H04L 47/805 (2013.01); H04L 47/808 (2013.01); H04L 47/824 (2013.01); H04L 49/90 (2013.01); H04L 51/00 (2013.01); H04L 61/15 (2013.01); H04L 61/157 (2013.01); H04L 61/1511 (2013.01); H04L 61/2038 (2013.01); H04L 61/2076 (2013.01); H04L 61/6063 (2013.01); H04L 63/08 (2013.01); H04L 63/10 (2013.01); H04L 65/103 (2013.01); H04L 65/104 (2013.01); H04L 65/1069 (2013.01); H04L 65/607 (2013.01); H04L 65/608 (2013.01); H04L 65/80 (2013.01); H04L 67/02 (2013.01); H04L 67/04 (2013.01); H04L 67/10 (2013.01); H04L 67/145 (2013.01); H04L 67/16 (2013.01); H04L 67/18 (2013.01); H04L 67/26 (2013.01); H04L 67/306 (2013.01); H04L 67/322 (2013.01); H04L 67/34 (2013.01); H04L 67/42 (2013.01); H04L 69/03 (2013.01); H04L 69/04 (2013.01); H04L 69/16 (2013.01); H04L 69/161 (2013.01); H04L 69/164 (2013.01); H04L 69/22 (2013.01); H04L 69/32 (2013.01); H04L 69/329 (2013.01); H04L 2012/6467 (2013.01); H04L 2012/6481 (2013.01); H04L 2012/6489 (2013.01); H04W 4/00 (2013.01); H04W 4/02 (2013.01); H04W 4/06 (2013.01); H04W 4/18 (2013.01); H04W 4/50 (2018.02); H04W 4/70 (2018.02); H04W 4/80 (2018.02); H04W 8/06 (2013.01); H04W 8/18 (2013.01); H04W 8/22 (2013.01); H04W 8/26 (2013.01); H04W 12/02 (2013.01); H04W 12/06 (2013.01); H04W 12/08 (2013.01); H04W 24/00 (2013.01); H04W 24/04 (2013.01); H04W 28/06 (2013.01); H04W 28/065 (2013.01); H04W 28/14 (2013.01); H04W 28/24 (2013.01); H04W 28/26 (2013.01); H04W 36/08 (2013.01); H04W 36/14 (2013.01); H04W 36/30 (2013.01); H04W 36/32 (2013.01); H04W 40/06 (2013.01); H04W 40/12 (2013.01); H04W 40/248 (2013.01); H04W 40/28 (2013.01); H04W 48/06 (2013.01); H04W 48/08 (2013.01); H04W 48/16 (2013.01); H04W 48/18 (2013.01); H04W 48/20 (2013.01); H04W 52/0229 (2013.01); H04W 56/00 (2013.01); H04W 64/00 (2013.01); H04W 72/0426 (2013.01); H04W 72/06 (2013.01); H04W 72/1236 (2013.01); H04W 72/1242 (2013.01); H04W 74/00 (2013.01); H04W 76/10 (2018.02); H04W 80/00 (2013.01); H04W 84/04 (2013.01); H04W 84/12 (2013.01); H04W 84/18 (2013.01); H04W 88/02 (2013.01); H04W 88/04 (2013.01); H04W 88/06 (2013.01); H04W 88/08 (2013.01); H04W 92/10 (2013.01); H04W 92/20 (2013.01)

(58) Field of Classification Search
USPC .................................................. 434/322, 323
See application file for complete search history.

(56) References Cited

U.S. PATENT DOCUMENTS

| | | | | | |
|---|---|---|---|---|---|
| 5,896,389 | A * | 4/1999 | Kobayashi | H04L 5/20 | 370/527 |
| 5,946,319 | A * | 8/1999 | Kobayashi | H04Q 11/0457 | 370/420 |
| 5,963,339 | A * | 10/1999 | Kobayashi | H04N 1/00127 | 358/435 |
| 6,535,587 | B1 * | 3/2003 | Kobayashi | H04M 11/06 | 379/90.01 |
| 6,765,995 | B1 * | 7/2004 | Kobayashi | H04M 1/271 | 379/88.01 |
| 6,904,277 | B2 * | 6/2005 | Tsutsumi | H04M 1/72519 | 370/331 |
| 6,907,258 | B2 * | 6/2005 | Tsutsumi | H04L 47/10 | 370/458 |
| 6,980,804 | B2 * | 12/2005 | Maki | H04W 36/30 | 370/331 |
| 7,006,837 | B2 * | 2/2006 | Shiota | H04W 88/06 | 370/229 |
| 7,076,554 | B1 * | 7/2006 | Kobayashi | H04M 7/0057 | 370/352 |
| 7,103,032 | B2 * | 9/2006 | Kobayashi | H04L 29/06027 | 370/352 |
| 7,106,220 | B2 * | 9/2006 | Gourgey | G09B 21/005 | 341/27 |
| 7,158,773 | B2 * | 1/2007 | Kurita | H04L 1/02 | 455/307 |
| 7,164,923 | B2 * | 1/2007 | Tsunomoto | H04W 48/16 | 455/422.1 |
| 7,193,975 | B2 * | 3/2007 | Tsutsumi | H04W 72/0426 | 370/254 |
| 7,206,406 | B2 * | 4/2007 | Kitami | H04M 1/6033 | 379/419 |
| 7,212,626 | B1 * | 5/2007 | Kobayashi | H04M 1/27455 | 379/354 |
| 7,218,627 | B2 * | 5/2007 | Shiota | H04W 48/18 | 370/338 |
| 7,228,523 | B2 * | 6/2007 | Kobayashi | G06F 17/5068 | 716/52 |
| 7,239,890 | B2 * | 7/2007 | Kitami | H04W 88/06 | 455/41.2 |
| 7,269,154 | B2 * | 9/2007 | Hosoda | H04W 28/26 | 370/338 |
| 7,269,161 | B2 * | 9/2007 | Kobayashi | H04L 29/12254 | 370/352 |
| 7,272,415 | B2 * | 9/2007 | Kobayashi | H04M 1/2478 | 379/201.04 |
| 7,281,143 | B2 * | 10/2007 | Parra | G06F 1/3209 | 713/300 |
| 7,289,820 | B2 * | 10/2007 | Shiota | H04W 56/00 | 455/13.1 |

(56) References Cited

U.S. PATENT DOCUMENTS 7,292,545 B2 * 11/2007 Maki ................ H04W 52/0229 370/311
7,301,937 B2 * 11/2007 Monai .................... H04L 29/06 370/351
7,302,281 B2 * 11/2007 Kobayashi ........... H04W 48/16 455/557
7,319,687 B2 * 1/2008 Tsutsumi ............... H04L 47/10 370/338
7,325,147 B2 * 1/2008 Satoh ....................... G06F 1/28 455/434
7,346,046 B2 * 3/2008 Kobayashi ............... H04L 1/08 370/352
7,346,065 B2 * 3/2008 Kobayashi .......... H04L 12/4625 370/392
7,356,034 B2 * 4/2008 Kobayashi ............. H04L 29/06 370/229
7,356,342 B2 * 4/2008 Kitami ................... H04L 69/22 455/452.1
7,394,805 B2 * 7/2008 Zen ...................... H04M 15/00 370/352
7,395,268 B2 * 7/2008 Kobayashi ........ G06F 17/30589
7,397,819 B2 * 7/2008 Kobayashi ............. H03M 7/30 370/469
7,398,109 B2 * 7/2008 Parra .................... H04L 1/0006 455/277.1
7,400,576 B2 * 7/2008 Mori ...................... H04L 47/15 370/229
7,420,925 B2 * 9/2008 Hori ..................... H04W 24/04 370/242
7,454,172 B2 * 11/2008 Kurita .................. H04W 16/14 455/561
7,496,186 B2 * 2/2009 Suzuki ............. H04L 29/06027 370/420
7,551,601 B2 * 6/2009 Inagi .................... H04L 12/467 370/338
7,567,539 B2 * 7/2009 Fujiwara .............. H04W 24/00 370/338
7,577,123 B2 * 8/2009 Hashimoto ............ H04L 29/06 370/328
7,590,103 B2 * 9/2009 Fujiwara .......... H04L 29/06027 370/352
7,599,692 B2 * 10/2009 Ooki .................... H04M 15/49 455/405
7,770,211 B2 * 8/2010 Kobayashi ........ H04L 29/06027 370/496
7,801,134 B2 * 9/2010 Hori ................. H04L 29/06027 370/352
7,808,957 B2 * 10/2010 Kitami ................. H04W 88/02 370/252
7,839,893 B2 * 11/2010 Ochi .................. H04L 12/6418 370/465
7,983,220 B2 * 7/2011 Kurita .................... H04W 8/18 370/331
8,000,298 B2 * 8/2011 Tsutsumi ............. H04W 36/08 370/328
8,234,364 B2 * 7/2012 Ooki ................. G06Q 30/0283 379/114.07
8,527,987 B2 * 9/2013 Johansson ................ G06F 8/61 455/41.1
8,597,028 B2 * 12/2013 Paul ........................ G09B 7/02 434/236
8,630,282 B2 * 1/2014 Tsutsumi .......... H04L 29/06027 370/294
9,326,115 B2 * 4/2016 Kobayashi ........... G06F 3/1206
9,489,951 B2 * 11/2016 Kobayashi ............. G06F 3/167
9,506,766 B2 * 11/2016 Kobayashi ......... G01C 21/3469
9,509,950 B2 * 11/2016 Kobayashi .......... H04L 12/1818
9,517,011 B2 * 12/2016 Kobayashi ............ G06Q 50/24
9,571,954 B2 * 2/2017 Kobayashi ........ H04M 1/72533
9,600,722 B2 * 3/2017 Kobayashi ............ G06Q 10/10
2004/0093528 A1 * 5/2004 Fujiwara .............. H04L 63/083 726/4
2004/0106379 A1 * 6/2004 Zen ...................... H04W 48/20 455/67.11
2004/0107263 A1 * 6/2004 Fujiwara ............ H04L 63/0272 709/210
2004/0110501 A1 * 6/2004 Arakaki ................. H04L 41/00 455/426.2
2004/0117498 A1 * 6/2004 Hashimoto ............... H04L 1/08 709/230
2005/0111390 A1 * 5/2005 Kobayashi ........ H04L 29/06027 370/282
2005/0259625 A1 * 11/2005 Hosoda .................. H04W 4/02 370/338
2006/0079286 A1 * 4/2006 Ochi ................... H01Q 1/2258 455/562.1
2006/0079287 A1 * 4/2006 Ochi ................... H01Q 1/2258 455/562.1
2006/0196343 A1 9/2006 Yung
2007/0191068 A1 * 8/2007 Ochi ................... H01Q 1/2258 455/562.1
2007/0243513 A1 10/2007 Ohshima et al.
2008/0263484 A1 * 10/2008 Kobayashi .......... G06F 17/5081 716/100
2008/0294451 A1 * 11/2008 Fujiwara .............. H04L 63/083 705/1.1
2008/0307442 A1 12/2008 Lim et al.
2010/0018381 A1 1/2010 Ohshima et al.
2010/0267368 A1 10/2010 Masputra
2011/0055355 A1 3/2011 Lee et al.
2011/0276961 A1 11/2011 Johansson et al.
2012/0158839 A1 * 6/2012 Hassan et al. ........ H04W 8/005
2012/0275324 A1 * 11/2012 Hashimoto ............... H04L 1/08 370/252
2015/0052190 A1 * 2/2015 Kobayashi ............. H04L 67/16 709/203
2015/0065111 A1 * 3/2015 Kobayashi ............. G06F 9/445 455/418
2015/0074223 A1 * 3/2015 Kobayashi ........... H04L 65/605 709/217
2015/0082299 A1 * 3/2015 Kobayashi ................ G06F 8/61 717/174
2015/0112823 A1 * 4/2015 Kobayashi ............... G07G 1/14 705/21
2015/0127124 A1 * 5/2015 Kobayashi ............ B25J 9/1689 700/83
2015/0155715 A1 * 6/2015 Kobayashi ................ H02J 3/32 307/24
2015/0264547 A1 * 9/2015 Kobayashi ............ G06Q 50/26 455/404.2
2015/0277547 A1 * 10/2015 Kobayashi ............. G06F 3/017 345/156
2015/0279183 A1 * 10/2015 Kobayashi .......... G08B 15/001 455/404.1
2015/0358428 A1 * 12/2015 Kobayashi ................ G06F 9/54 709/203

FOREIGN PATENT DOCUMENTS

JP 2008-279862 A 11/2008
JP 2010-218347 A 9/2010
JP 2011-044147 A 3/2011
JP 2012-514378 A 6/2012
WO WO-2006/092098 A1 9/2006
WO WO-2007/073353 A1 6/2007
WO WO-2010/077194 A1 7/2010

OTHER PUBLICATIONS

International Search Report corresponding to PCT/JP2013/064235, dated Jul. 23, 2013 (3 pages).
Japanese Office Action issued in corresponding Japanese Patent Application No. 2012-123803, dated Nov. 22, 2016, 4 pages.

* cited by examiner

213

611 612 613 614 615

| DEVICE DESCRIPTOR | | | | | | DEVICE ID | MODEL | VERSION | CAPABILITY | ... |
|---|---|---|---|---|---|---|---|---|---|---|
| DEVICE CLASS | DEVICE SUBCLASS | VENDOR ID | PRODUCT ID | SERIAL NUMBER | ... | | | | | |
| | | | | | | | | | | |
| | | | | | | | | | | |
| | | | | | | | | | | |

| Offset | Field | Size | Value | Description |
|---|---|---|---|---|
| 0 | bLength | 1 | 0x12 | Dscriptor Size |
| 1 | bDescriptorType | 1 | 0x01 | Device Descriptor |
| 2 | bcdUSB | 2 | 0x0200 | USB Rev |
| 4 | bDeviceClass | 1 | 0xNN | Device Class |
| 5 | bDeviceSubClass | 1 | 0xNN | Device Subclass |
| 6 | bDeviceProtocol | 1 | 0xNN | Protocol Code |
| 7 | bMaxPacketSize0 | 1 | 0xNN | MAXIMUM PACKET SIZE FOR ENDPOINT 0 |
| 8 | idVendor | 2 | 0xNNNN | Vendor ID |
| 10 | idProduct | 2 | 0xNNNN | Product ID |
| 12 | bcdDevice | 2 | 0xNNNN | FIRMWARE VERSION OF USB PORTION |
| 14 | iManufactuer | 1 | 0x01 | INDEX OF STRING DESCRIPTOR INDICATING NAME OF MAKER |
| 15 | iProduct | 1 | 0x02 | INDEX OF STRING DESCRIPTOR INDICATING NAME OF PRODUCT |
| 16 | iSerialNumber | 1 | 0x03 | INDEX OF STRING DESCRIPTOR INDICATING IMEI |
| 17 | bNumConfigurations | 1 | 0xNN | NUMBER OF CONFIGURATIONS |

| EDUCATION APPLICATION ID (701) | EDUCATION APPLICATION CONTENTS (702) | FIRST EDUCATION GROUP (703) | | | SECOND EDUCATION GROUP (704) | | | ... | nTH EDUCATION GROUP (705) | | |
|---|---|---|---|---|---|---|---|---|---|---|---|
| | | ID | RANGE | TIME PERIOD | ID | RANGE | TIME PERIOD | | ID | RANGE | TIME PERIOD |
| | | | | | | | | | | | |
| | | | | | | | | | | | |
| ... | ... | | | | | | | | | | |

| DEVICE ID (801) | DEVICE INFORMATION (802) | EDUCATION APPLICATION ID (803) | USE DRIVER (804) |
|---|---|---|---|
| | | | |
| | | | |
| | | … | |
| … | | | |

| DEVICE ID (1011) | DEVICE POSITION (1012) | EDUCATION GROUP ID (1013) | EDUCATION APPLICATION (1014) | PLAYBACK POSITION (1015) | ... |
|---|---|---|---|---|---|
| | | | | | |
| | | | | | |
| ... | | | | | |

| DEVICE ID (1021) | DEVICE INFORMATION (1022) | EDUCATION APPLICATION (1023) | USE DRIVER (1024) | USE PARAMETER (1025) | ... |
|---|---|---|---|---|---|
| | | | | | |
| | | | | | |
| ... | | | | | |

| EDUCATION APPLICATION ID (1701) | EDUCATION APPLICATION CONTENTS (1702) | FIRST EDUCATION GROUP (1703) | | | ... | nTH EDUCATION GROUP (1704) | | |
|---|---|---|---|---|---|---|---|---|
| | | INTERRUPT TIME | INTERRUPT POSITION | EDUCATION GROUP CONDITION | | INTERRUPT TIME | INTERRUPT POSITION | EDUCATION GROUP CONDITION |
| | | | | | | | | |
| | | | | | | | | |
| ... | ... | | | | | | | |

| 1801 EDUCATION APPLICATION ID | 1802 EDUCATION GROUP ID | 1803 RESUMPTION TIME | 1804 RESUMPTION POSITION | ... |
|---|---|---|---|---|
| | | | | |
| | | | | |
| ... | | | | |

| DEVICE INFORMATION (2401) | VIDEO INFORMATION (2402) | FIRST STATUS PREDICTION (2403) | VOICE INFORMATION (2404) | SECOND STATUS PREDICTION (2405) | STATUS ESTIMATE (2406) | COPING INFORMATION (2407) | |
|---|---|---|---|---|---|---|---|
| | | | | | | COPING ID | CONTENTS OF ANNOUNCEMENT |
| | | | | | | | |
| | | | | | | | |
| | ... | | | | | | |
| | | | | | | | |
| | ... | | | | | | |
| ... | | | | | | | |

FIG. 24

SUPPORTING POPULARIZATION OF INFORMATION AND COMMUNICATIONS TECHNOLOGY IN THE FIELD OF EDUCATION

CROSS-REFERENCE TO RELATED APPLICATIONS

This application is a national stage application of International Application No. PCT/JP2013/064235 entitled "INFORMATION PROCESSING SYSTEM, INFORMATION PROCESSING METHOD, INFORMATION PROCESSING APPARATUS, PORTABLE TERMINAL, AND CONTROL METHOD AND CONTROL PROGRAM THEREOF," filed on May 22, 2013, which claims the benefit of the priority of Japanese Patent Application No. 2012-123803, filed on May 30, 2012, the disclosures of each of which are hereby incorporated by reference in their entirety.

TECHNICAL FIELD

The present invention relates to a technique of supporting popularization of ICT (Information and Communications Technology) education in the field of education.

BACKGROUND ART

In the above technical field, patent literature 1 discloses a technique of distributing data of the same contents to a number of students via portable telephones in the field of education. In addition, patent literature 2 discloses a technique of controlling a USB device from a server by connecting the USB device to a thin client in a thin client-server system.

CITATION LIST

Patent Literature

Patent literature 1: Japanese Patent Laid-Open No. 2002-010360

Patent literature 2: Japanese Patent Laid-Open No. 2010-218347

SUMMARY OF THE INVENTION

Technical Problem

In the techniques described in the above literatures, however, in the field of education, it is impossible to support to provide hardware resources for implementing ICT education. For example, an enormous load and time are required to replenish a lack of IT devices or recover failed IT devices.

The present invention enables to provide a technique of solving the above-described problem.

Solution to Problem

One aspect of the present invention provides an information processing apparatus comprising:

a device information receiver that receives, from the portable terminal via a network, device information for identifying a device connected to a portable terminal;

an education application selector that selects, based on the device information received by the device information receiver, an education application to be provided to the device; and an education application provider that provides the education application to the device via the network and the portable terminal.

Another aspect of the present invention provides a control method for an information processing apparatus, comprising:

receiving, from the portable terminal via a network, device information for identifying a device connected to a portable terminal;

selecting, based on the device information received in the receiving, an education application to be provided to the device; and providing the education application to the device via the network and the portable terminal.

Yet another aspect of the present invention provides a control program of an information processing apparatus for causing a computer to execute a method, comprising:

receiving, from the portable terminal via a network, device information for identifying a device connected to a portable terminal;

selecting, based on the device information received in the receiving, an education application to be provided to the device; and providing the education application to the device via the network and the portable terminal.

Yet another aspect of the present invention provides a portable terminal comprising:

a device connector;

a device information transmitter that transmits, to an information processing apparatus, device information for identifying a device connected to the device connector; and a device control relay unit that relays control of the device by the information processing apparatus based on the device information.

Yet another aspect of the present invention provides a control method for a portable terminal including a device connector, comprising:

transmitting, to an information processing apparatus, device information for identifying a device connected to the device connector; and relaying control of the device by the information processing apparatus based on the device information.

Yet another aspect of the present invention provides a control program of a portable terminal including a device connector for causing a computer to execute a method, comprising:

transmitting, to an information processing apparatus, device information for identifying a device connected to the device connector; and relaying control of the device by the information processing apparatus based on the device information.

Still other aspect of the present invention provides an information processing system including a portable terminal with a device connector, a device connectable to the device connector, and an information processing apparatus connected to the portable terminal via a network, the portable terminal comprising:

- a device information transmitter that transmits device information for identifying the device connected to the device connector to the information processing apparatus; and
- a device control relay unit that relays control of the device by the information processing apparatus based on the device information, and the information processing apparatus comprising:

n education application selector that selects, based on the device information, an education application to be provided to the device; and an education application provider that provides the education application to the device via the network and the portable terminal.

Still other aspect of the present invention provides an information processing method of an information processing system including a portable terminal with a device connector, a device connectable to the device connector, and an information processing apparatus connected to the portable terminal via a network, the method comprising:

transmitting device information for identifying the device connected to the device connector from the portable terminal to the information processing apparatus;

selecting, based on the device information, an education application to be provided to the device;

providing the education application to the device via the network and the portable terminal; and relaying, by the portable terminal, control of the device performed by the information processing apparatus based on the device information.

Advantageous Effects of Invention

According to the present invention, it is possible to readily provide hardware resources for implementing ICT education in the field of education.

BRIEF DESCRIPTION OF DRAWINGS

FIG. 6A is a table showing the structure of a device DB according to the second embodiment of the present invention;

FIG. 6B is a table showing the structure of a device descriptor according to the second embodiment of the present invention;

FIG. 7 is a table showing the structure of an education application DB according to the second embodiment of the present invention;

FIG. 8 is a table showing the structure of a device driver DB according to the second embodiment of the present invention;

FIG. 10A is a table showing the structure of an education application selection table according to the second embodiment of the present invention;

FIG. 10B is a table showing the structure of a device driver selection table according to the second embodiment of the present invention;

FIG. 17 is a table showing the structure of a history saving DB according to the third embodiment of the present invention;

FIG. 18 is a table showing the structure of an education application resumption table according to the third embodiment of the present invention;

FIG. 24 is a table showing the structure of an operation proposal DB according to the fourth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing apparatus 100 according to the first embodiment of the present invention will be described with reference to FIG. 1. The information processing apparatus 100 is an apparatus that provides, via a network 130, an education application to a device 110 connected to a portable terminal 120.

Figure 1:
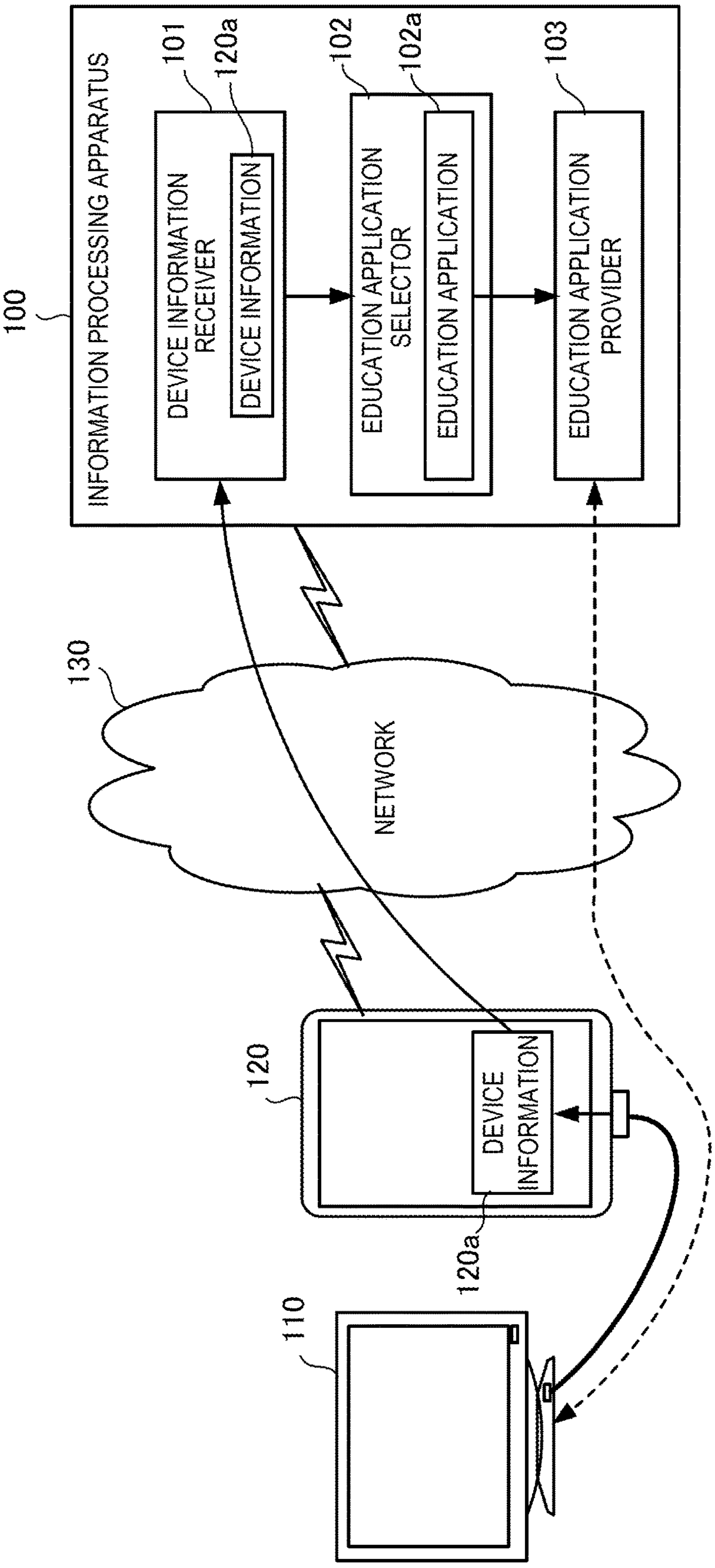
FIG. 1 is a block diagram showing the arrangement of an information processing apparatus according to the first embodiment of the present invention.

As shown in FIG. 1, the information processing apparatus 100 includes a device information receiver 101, an education application selector 102, and an education application provider 103. The device information receiver 101 receives, from the portable terminal 120 via the network 130, device information 120*a* for identifying the device connected to the portable terminal 120. Based on the device information 120*a* received by the device information receiver 101, the education application selector 102 selects an education application 102*a* to be provided to the device. The education application provider 103 provides the education application 102*a* to the device 110 via the network 130 and portable terminal 120.

According to this embodiment, an education application is provided from a cloud server to a device by only connecting the device to a portable terminal. It is, therefore, possible to readily support to provide hardware resources for implementing ICT education in the field of education.

Second Embodiment

An information processing system according to the second embodiment of the present invention will be described. Note that in this embodiment, a cloud server will be used as an example of a server in the following description. The information processing system according to this embodiment readily replenishes a lack of hardware resources or readily recovers device failures in the field of education of ICT education by connecting the device to the cloud server as an information processing apparatus via a portable terminal.

According to this embodiment, a cloud server controls a device by only connecting the device to the cloud server via a portable terminal. Therefore, it is possible to readily implement ICT education while suppressing the load in the field of education.

<<Information Processing System>>

The operation of an information processing system 200 according to this embodiment will be explained with reference to FIGS. 2A to 3E.

(Concept of Operation)

Figure 2A:
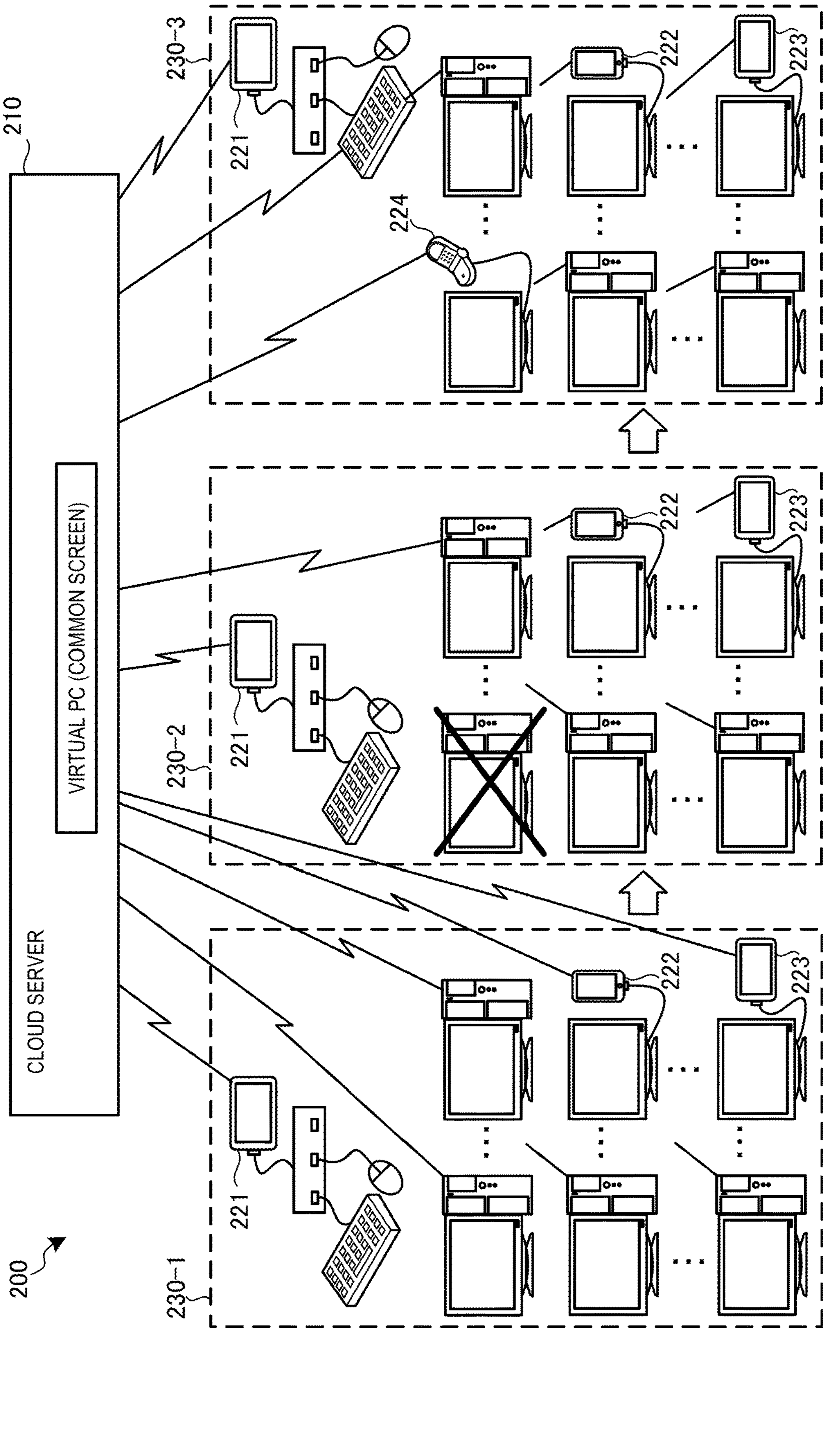
FIG. 2A is a view for explaining the concept of the operation of an information processing system according to the second embodiment of the present invention.

FIG. 2A is a view for explaining the concept of the operation of the information processing system 200 according to this embodiment.

FIG. 2A shows a case in which a cloud server 210 provides a shared screen for an education application to education groups 230-1 to 230-3. The state of a device in each of the education groups 230-1 to 230-3 changes from left to right. The education groups 230-1, 230-2, and 230-3 indicate this transition.

In the left view, the education group 230-1 indicates a status at the start of the education application. In the education group 230-1, assuming that the PC of a teacher is not operating properly, a keyboard and pointing device are connected to a portable terminal 221 via a USB cable and a USB router, thereby substituting the portable terminal 221 for the PC of the teacher. The portable terminal 221 only serves as a display, and the cloud server 210 processes operations by the keyboard and pointing device, and the like. On the other hand, the displays of two of the PCs of students are respectively connected to portable terminals 222 and 223 via USB cables, thereby executing screen display by the cloud server 210. With this arrangement, it is possible to prevent ICT education from being stopped due to the lack of a device in the field of education by alternatively executing control from the cloud server 210 via a portable terminal. Note that although not shown in FIG. 2A, the necessary number of devices is calculated in advance based on contents and an attendance according to a class schedule.

In the central view, the education group 230-2 indicates a state in which an operation has been interrupted due to a failure of one PC marked with X. As shown in the left view, since the education application starts after the necessary display devices are prepared, there is no preliminary PC for the failed PC. In this case, as indicated by the education group 230-3 in the right view, the display of the failed PC is connected to a portable terminal 224 (a portable telephone in FIG. 2A) via a USB cable, and the cloud server 210 executes control, thereby substituting for the failed PC. Note that if the display was USB-connected to the PC, the display can be used. As described above, even if a failure occurs while providing the education application, it is possible to continue the education application without stopping it.

(System Configuration)

Figure 2B:
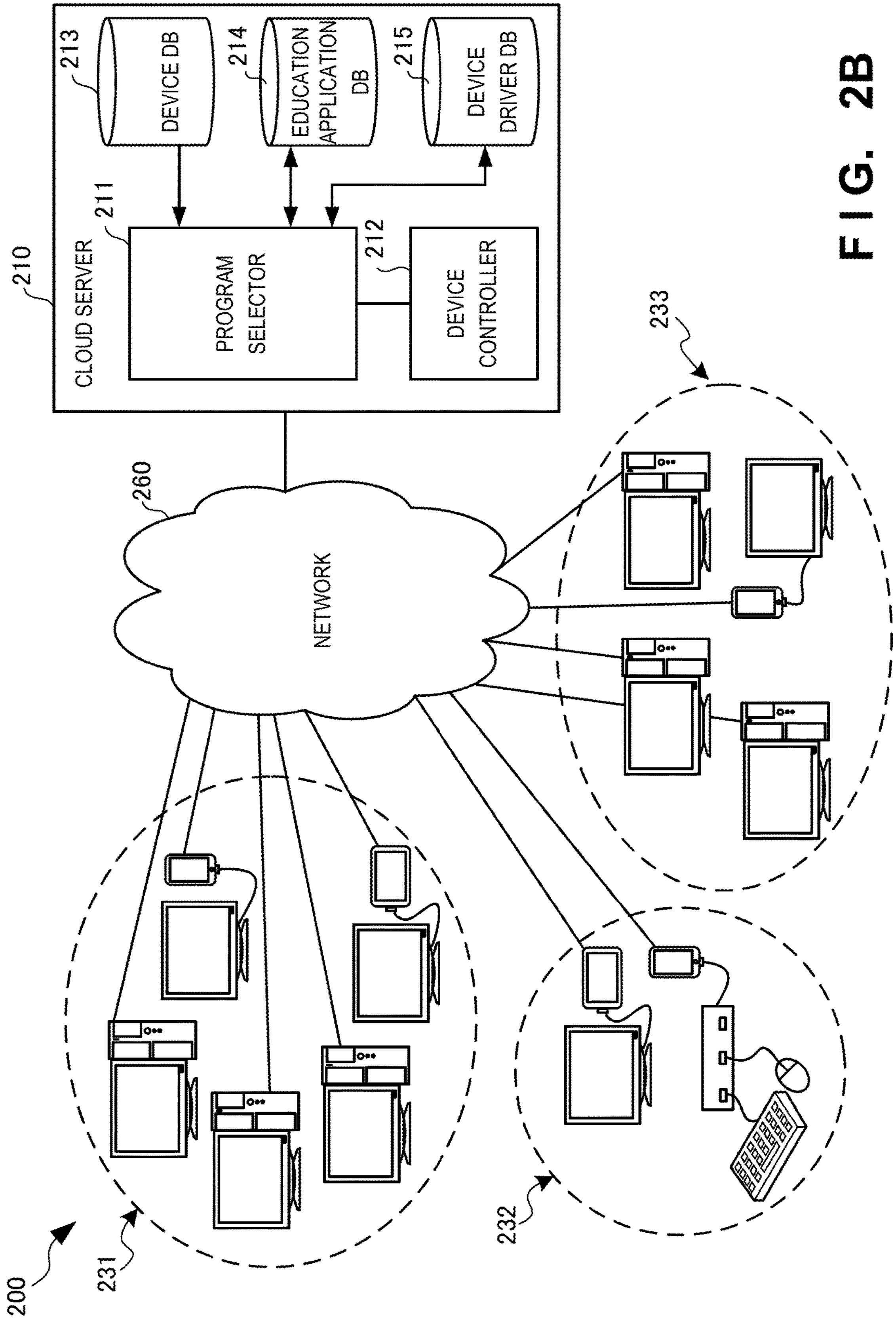
FIG. 2B is a block diagram showing the configuration of the information processing system according to the second embodiment of the present invention.

FIG. 2B is a block diagram showing the configuration of the information processing system 200 according to this embodiment.

Referring to FIG. 2B, ICT education devices deployed in different places are connected to the cloud server 210 via a network 260. FIG. 2B shows three education groups 231 to 233. Each education group may correspond to each classroom or class. Alternatively, the respective education groups may indicate students (members) who take the same education application (education program) even though their positions are different.

As shown in FIG. 2B, each of the education groups 231 to 233 includes an ordinary PC (Personal Computer) having a function capable of controlling a connected device, and an arrangement in which a device, especially a display is connected via the USB cable of a portable terminal and the portable terminal is connected to the cloud server 210 via the network. Note that the portable terminal has no function of controlling a connected device, and the cloud server 210 directly controls the connected device to provide the education application. When a PC fails, a portable terminal to which a device is connected substitutes for the PC in cooperation with the cloud server 210.

The cloud server 210 as an information processing apparatus includes a program selector 211, a device controller 212, a device database (to be referred to as a DB hereinafter) 213, an education application DB 214, and a device driver DB 215. Based on pieces of information from PCs and portable terminals each connected to a device, the program selector 211 selects the same education application if the PCs and the portable terminals belong to the same education group. If the cloud server 210 is connected to each device via the corresponding portable terminal, the program selector 211 also selects a device driver program for driving the device so as to be able to provide the education application to the device. The education application is selected by referring to the education application DB 214 (see FIG. 7). The device driver program is selected by referring to the device DB 213 (see FIG. 6A) and the device driver DB 215 (see FIG. 8).

The device controller 212 provides the education application selected according to the education group to each PC, and also provides the selected application to each device via the corresponding portable terminal by executing the selected device driver program.

(Operation Procedure)

Figure 3A:
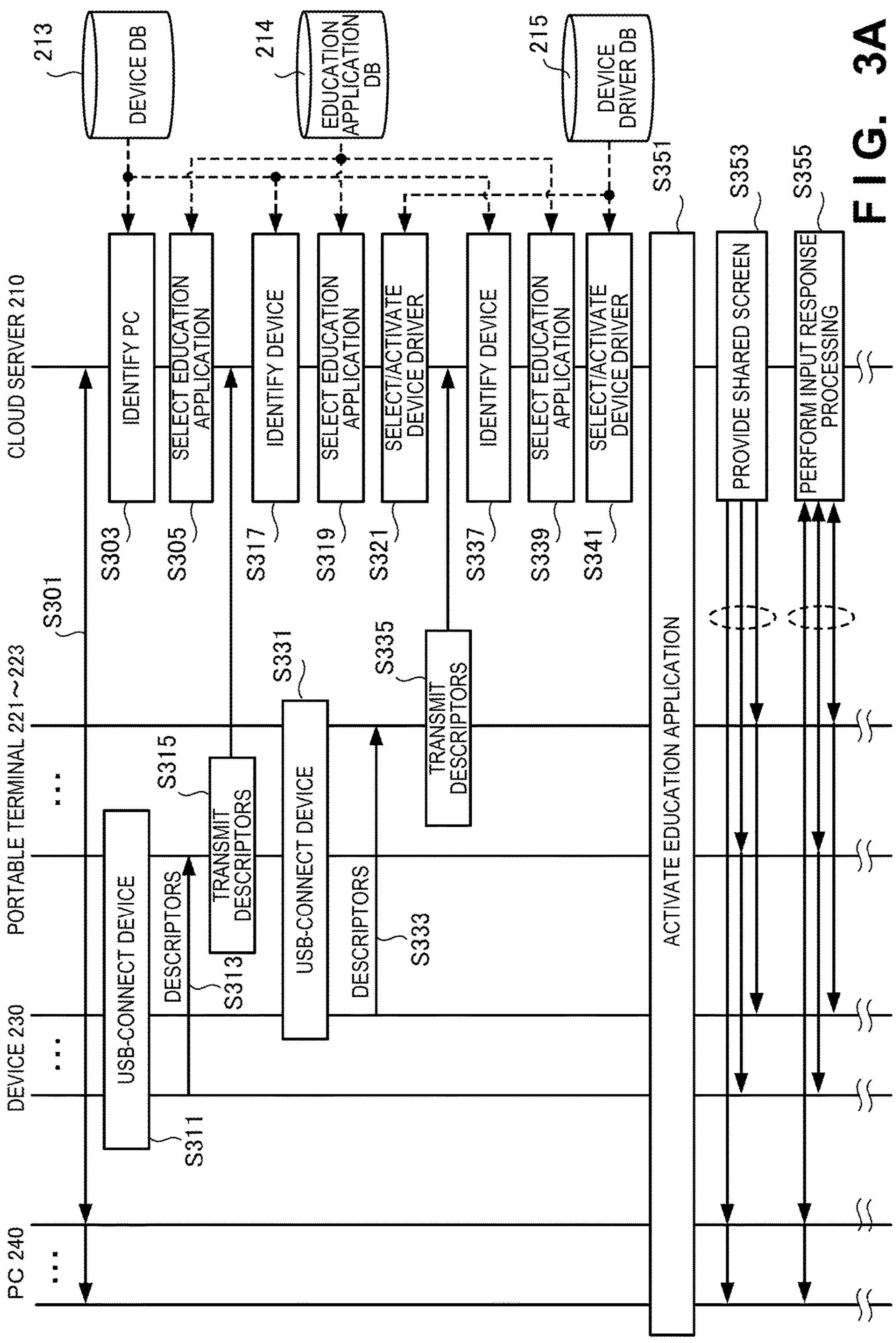
FIG. 3A is a sequence chart showing the operation procedure of the information processing system at the start of an education application according to the second embodiment.

FIG. 3A is a sequence chart showing the operation procedure of the information processing system 200 at the start of an education application according to this embodiment. Note that a portable terminal 220, a device 230, and a PC 240 will be used for the sake of simplicity in the following description.

In step S301, the PC 240 establishes communication with the cloud server 210 via the network, and transmits computer information. In step S303, the cloud server 210 receives the computer information, and specifies the PC with which communication has been established. In step S305, based on the ID and the position information of the PC, the cloud server 210 determines an education group to which the PC belongs, and selects an education application to be provided. Referring to FIG. 3A, the device 230 is USB-connected to the portable terminal 220, in place of a lack of a PC.

In step S311, the device 230 is USB-connected to the portable terminal 220. In step S313, the portable terminal 220 reads out descriptors from the device 230 by a general-purpose USB driver. In step S315, the portable terminal 220 transmits the readout descriptors to the cloud server 210. In step S317, the cloud server 210 specifies the connected device based on the descriptors by referring to the device DB 213. In step S319, the cloud server 210 determines a belonging education group based on the ID of the device, the position information of the portable terminal 220, and the like by referring to the education application DB 214, thereby selecting an education application to be provided. In step S321, the cloud server 210 selects and activates a device driver based on the specified device and the selected education application by referring to the device driver DB 215.

When the device 230 is connected to another portable terminal 220, the following procedure is executed, similarly to steps S311 to S321. In step S331, the device 230 is USB-connected to the portable terminal 220. In step S333, the portable terminal 220 reads out descriptors from the device 230 by a general-purpose USB driver. In step S335, the portable terminal 220 transmits the readout descriptors to the cloud server 210. In step S337, the cloud server 210 specifies the connected device based on the descriptors by referring to the device DB 213. In step S339, the cloud server 210 determines a belonging education group based on the ID of the device, the position information of the portable terminal 220, and the like by referring to the education application DB 214, thereby selecting an education application to be provided. In step S341, the cloud server 210 selects and activates a device driver based on the specified device and the selected education application by referring to the device driver DB 215. The position information of the portable terminal 220 includes, for example, the position and number of a classroom. Furthermore, in step S339, the cloud server 210 may determine a belonging education group based on timetable information, the position information of the portable terminal 220, and the like by referring to the education application DB 214, thereby selecting an education application to be provided.

In the example shown in FIG. 3A, since the PC 240 and the device 230 connected to the portable terminal 220 belong to the same education group, the cloud server 210 provides the same education application. In step S351, the same education application is activated. In step S353, a shared screen is provided to the PC 240 and to the device 230 via the portable terminal 220. If the cloud server 210 receives an input from the PC 240 or device 230, it responds to the input in step S355.

Figure 3B:
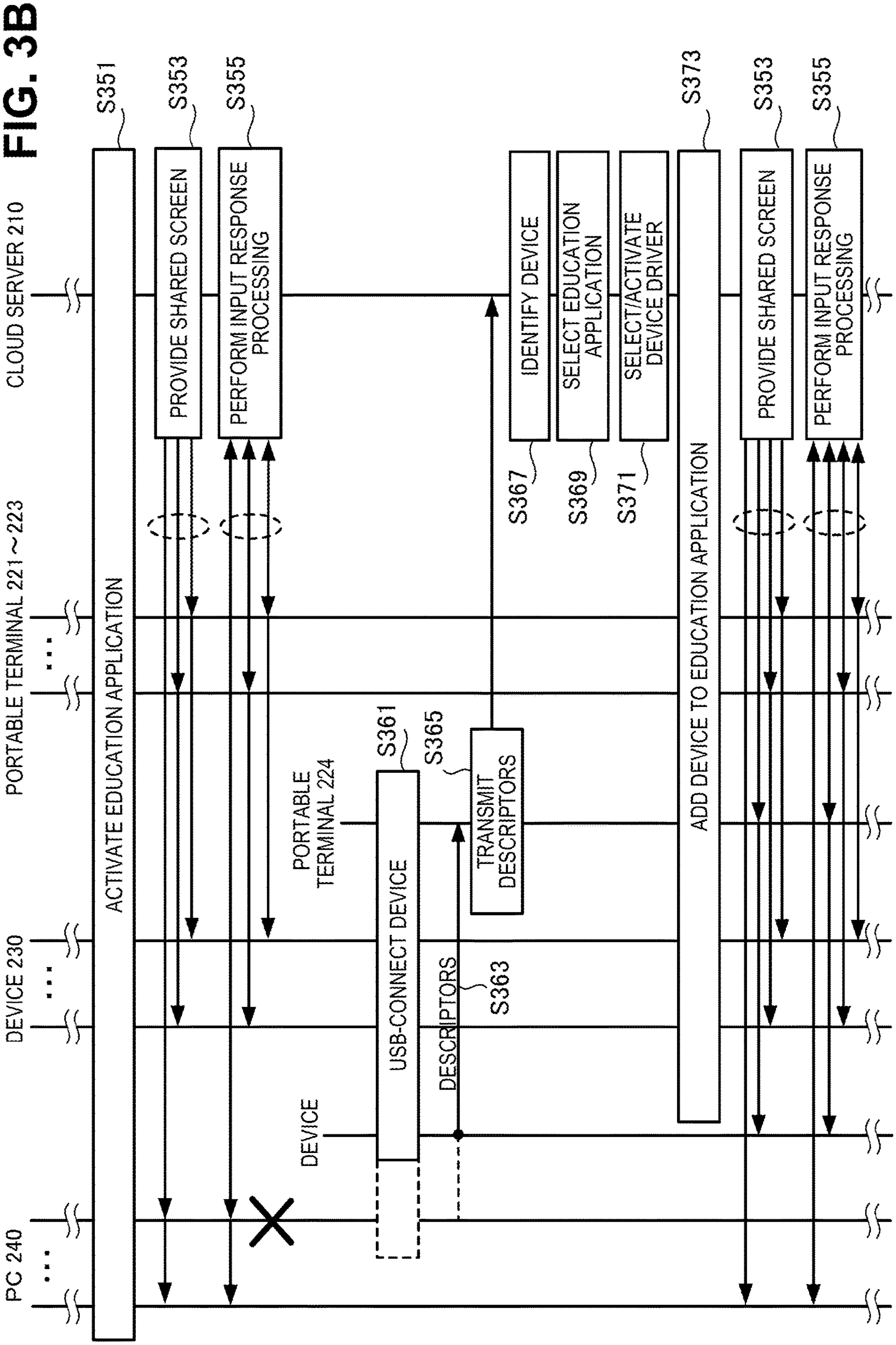
FIG. 3B is a sequence chart showing the operation procedure of the information processing system at the time of a failure of a device according to the second embodiment of the present invention.

FIG. 3B is a sequence chart showing the operation procedure of the information processing system 200 at the time of a failure of a device according to this embodiment. Note that the same step numbers as in FIG. 3A denote the same steps and a description thereof will be omitted.

Assume that one of the PCs 240 cannot operate due to a failure while providing the education application. In step S361, a new device or a device which was connected to the failed PC 240 is USB-connected to the portable terminal 224. In step S363, the portable terminal 224 reads out descriptors from the device by a general-purpose USB driver. In step S365, the portable terminal 220 transmits the descriptors to the cloud server 210. In step S367, the cloud server 210 specifies the connected device based on the descriptors by referring to the device DB 213. In step S369, the cloud server 210 determines a belonging education group based on the ID of the device, the position information of the portable terminal 220, and the like by referring to the education application DB 214 thereby selecting an education application to be provided. In step S371, the cloud server 210 selects and activates a device driver based on the specified device and the selected education application by referring to the device driver DB 215.

Since the cloud server 210 determines that the device connected to the portable terminal 224 belongs to the same education group, in step S373 the cloud server 210 adds the device as a providing destination of the education application activated in step S351. In steps S353 and S355, the education application continues without being interrupted, the shared screen is provided to the device via the portable terminal 224, and the cloud server 210 responds to an input from the device, as needed.

(USB Device Control Procedure)

Figure 3C:
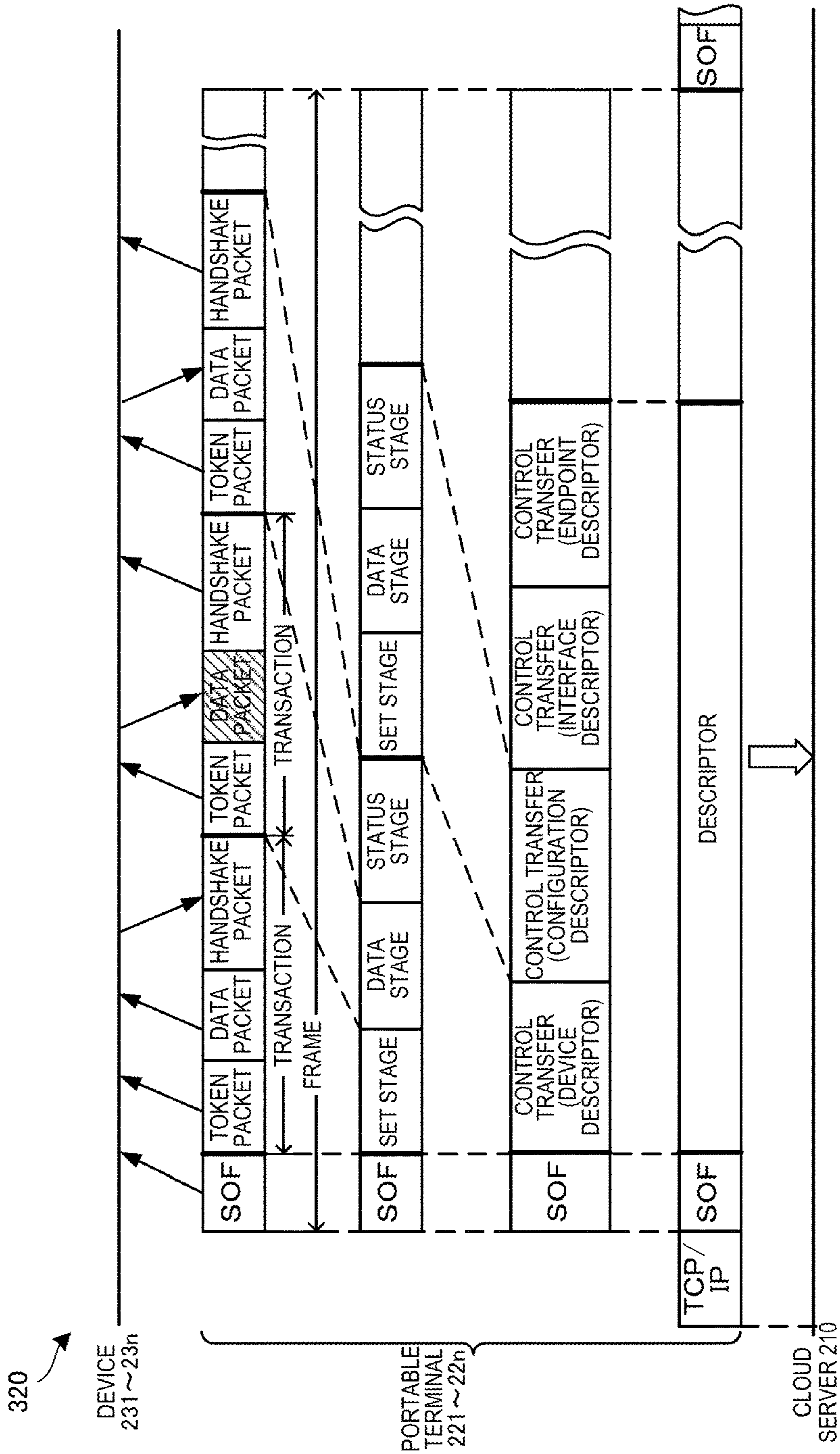
FIG. 3C is a sequence chart showing the control procedure of a USB-connected USB device according to the second embodiment of the present invention.
Figure 3D:
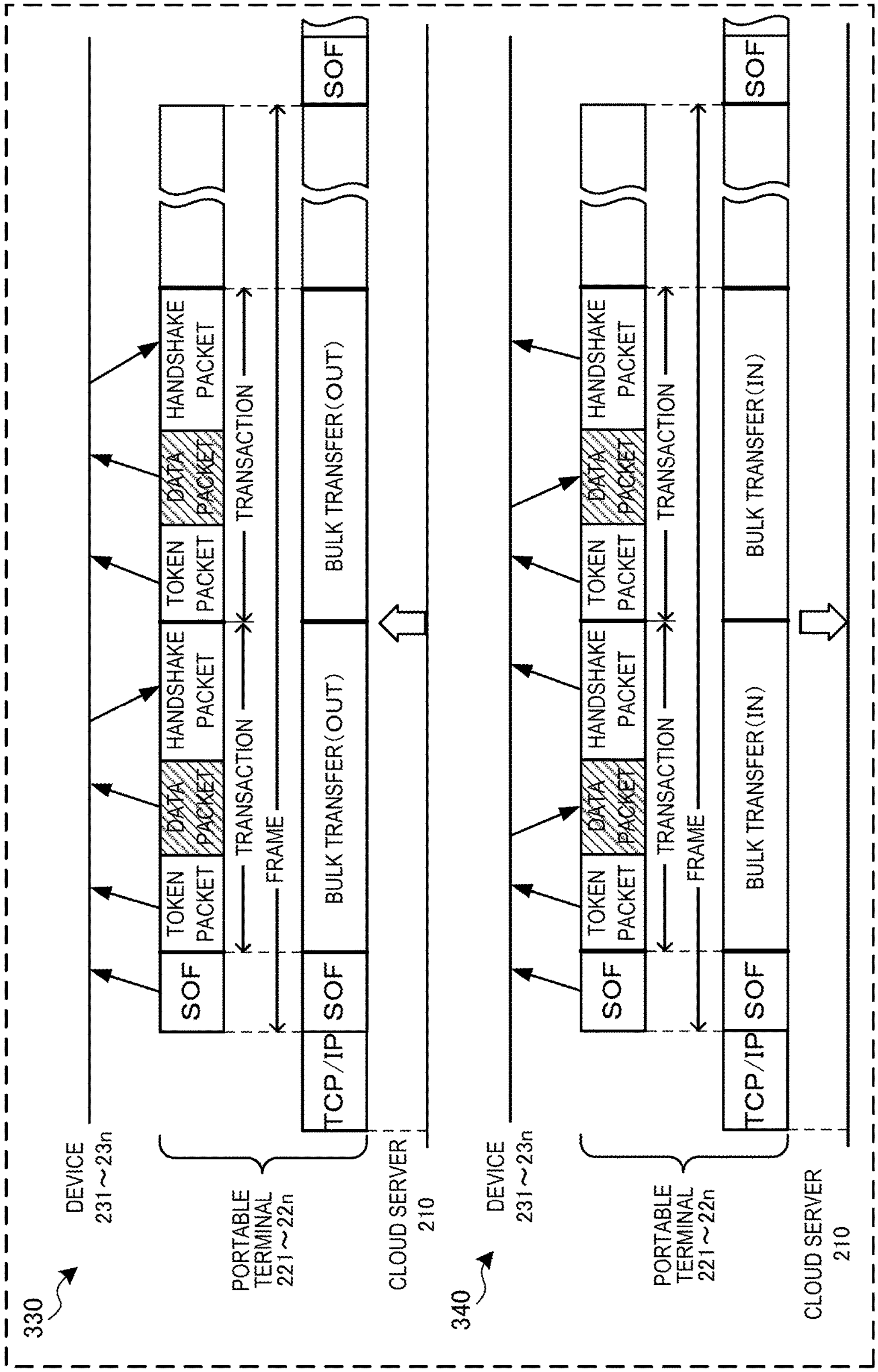
FIG. 3D is a sequence chart showing the control procedure of the USB-connected USB device according to the second embodiment of the present invention.

FIGS. 3C and 3D are sequence charts showing the control procedure of a USB-connected USB device according to this embodiment. Note that the portable terminal 220 and device 230 will be used for the sake of simplicity.

FIG. 3C is a sequence chart showing a procedure 320 of acquiring the descriptors of a USB-connected USB device.

The descriptors set in the device 230 are acquired by a USB request such as GET_DESCRIPTOR. Each USB request is exchanged with the device 230 by control transfer. Each control transfer is formed from a set stage, a data stage, and a status stage. Each stage is formed from a token packet, a data packet, and a handshake packet. A descriptor is acquired by the data packet of each data stage.

The descriptors acquired from the device 230 are IP-encapsulated by an IP header or TCP header, and transmitted from the portable terminal 220 to the cloud server 210.

FIG. 3D is a sequence chart showing the data input/output procedure of the USB-connected USB device. This procedure includes a procedure 330 of outputting data from the cloud server 210 to the device 230, and a procedure 340 of inputting data from the device 230 to the cloud server 210.

In the procedure 330 of outputting data to the device 230, first, IP-encapsulated output data is transmitted from the cloud server 210 to the portable terminal 220. Next, the portable terminal 220 transfers data acquired by decapsulation to the device 230 by bulk transfer (OUT). Each bulk transfer (OUT) is formed from a token packet, a data packet, and a handshake packet.

In the procedure 340 of inputting data from the device 230, first, the portable terminal 220 acquires input data from the device 230 by bulk transfer (IN). Each bulk transfer (IN) is formed from a token packet, a data packet, and a handshake packet. Next, IP-encapsulated input data is transmitted from the portable terminal 220 to the cloud server 210.

(Non-USB Device Control Procedure)

Figure 3E:
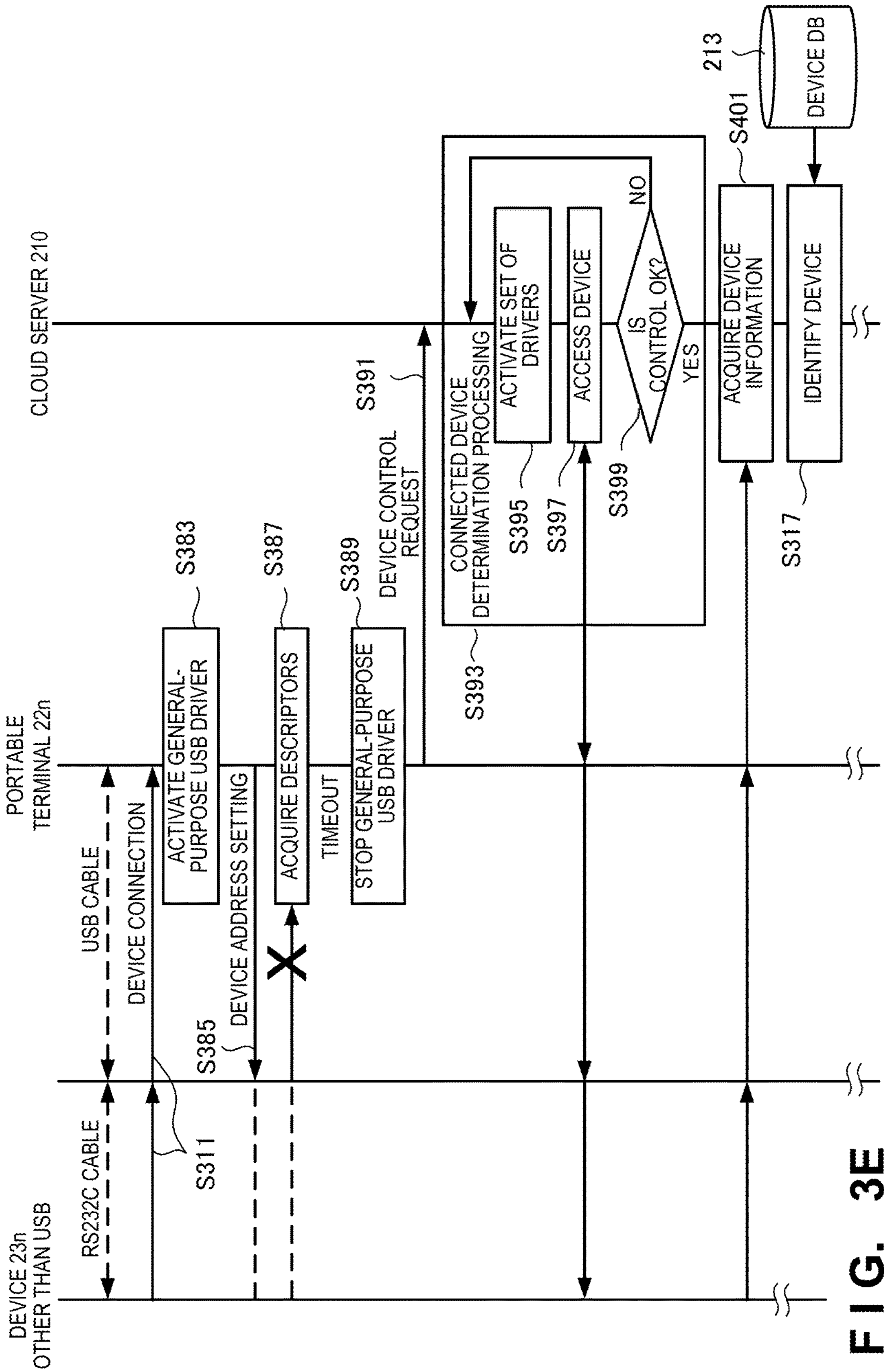
FIG. 3E is a sequence chart showing the control procedure of a device other than the USB-connected USB device according to the second embodiment of the present invention.

FIG. 3E is a sequence chart showing the control procedure of a device other than a USB-connected USB device according to this embodiment.

In FIG. 3E, as an example in which the portable terminal 220 cannot acquire device information, a case where a device 23*n* is connected from an RS232C cable to a USB cable will be described. Assume that the portable terminal 220 has no special driver configured to acquire, from a USB packet, the device information of the device 23*n* connected to the RS232C cable. However, the present invention is not limited to this. Note that the same step numbers as in FIGS. 3A and 3B denote the same steps in FIG. 3E, and a description thereof will be omitted.

In step S311, the device 23*n* is connected to the portable terminal 220 via an RS232C cable and a USB cable. From step S383, the portable terminal 220 attempts to acquire the descriptors of the device 23*n* by activating a general-purpose USB driver. However, in step S387, a timeout occurs without acquiring the descriptors.

Upon detecting the timeout, the portable terminal 220 stops processing of the general-purpose USB driver in step S389. In step S391, the portable terminal 220 requests the cloud server 210 to control the connected device 23*n*.

Upon receiving the device control request, the cloud server 210 sequentially operates drivers capable of operating the connected device 23*n* and determines the connected device 23*n* in step S393. More specifically, first, in step S395, the cloud server 210 activates a set of drivers. In step S397, the cloud server 210 accesses the device 23*n* by the activated drivers. In step S399, the cloud server 210 determines whether the device 23*n* is controllable. Upon determining that the device 23*n* is controllable, the cloud server 210 acquires the device information by the drivers in step S401. The drivers include a driver that implements conversion between RS232C and USB in addition to the drivers capable of driving the device.

When the device information is acquired, the cloud server 210 specifies the device 23*n* by referring to the device DB 213 in step S317. From then on, the same processing as in FIG. 3A is performed.

<<Functional Arrangement of Cloud Server>>

Figure 4:
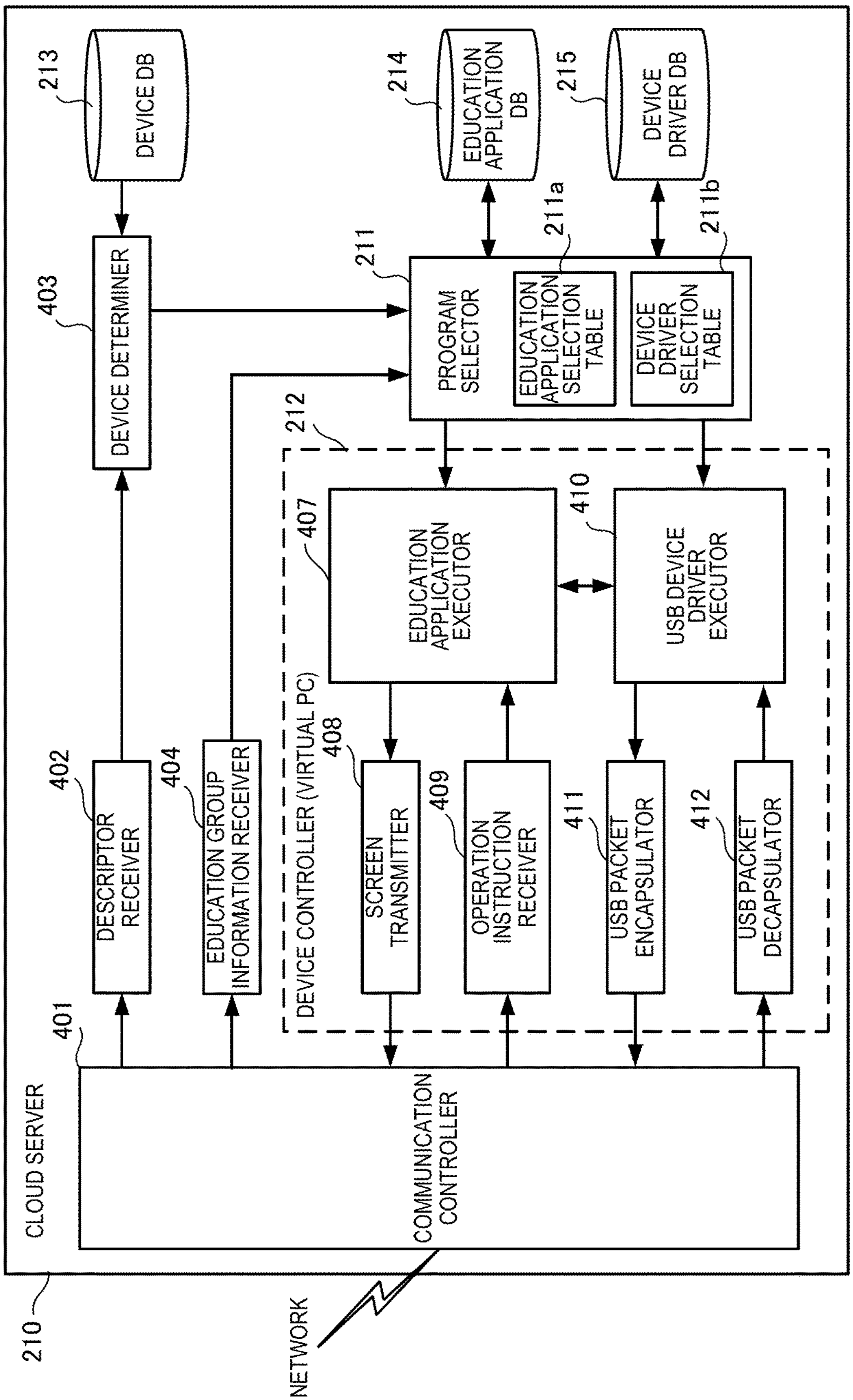
FIG. 4 is a block diagram showing the functional arrangement of a cloud server according to the second embodiment of the present invention.

FIG. 4 is a block diagram showing the functional arrangement of the cloud server 210 according to this embodiment. Note that the portable terminal 220 will be representative of the portable terminals for the sake of simplicity in the following description. In fact, an arrangement for user registration and the like is also included. The arrangement, however, will be omitted in order to avoid cumbersomeness in FIG. 4.

The cloud server 210 includes a communication controller 401 that communicates with the portable terminal 220 via the network 260. From a message received by the communication controller 401 from the portable terminal 220, a descriptor receiver 402 receives descriptors acquired from the device 230 connected to the portable terminal 220. A device determiner 403 specifies the device 230 connected to the portable terminal 220 by referring to the device DB 213 (see FIG. 6A) based on the descriptors of the device 230 received from the portable terminal 220. An education group information receiver 404 receives information for identifying an education group, which has been transmitted by the portable terminal 220 that has also transmitted the descriptors. The information for identifying an education group includes the ID of a classroom or class of a school, timetable information such as a day of the week and time period, information for identifying the current position of the portable terminal 220, and the ID of an education application to be taken independently of the position.

The program selector 211 has an education application selection table 211*a* (see FIG. 10A) and a device driver selection table 211*b* (see FIG. 10B). The program selector 211 selects an education application to be provided to the specified education group by referring to the education application DB 214 based on device information from the device determiner 403 and education group information from the education group information receiver 404. Furthermore, the program selector 211 selects a device driver suitable for the selected education application by referring to the device driver DB 15 based on the device information from the device determiner 403.

The device controller 212 includes an education application executor 407 for executing the application selected by the program selector 211. The education application executor 407 generates a shared screen to be transmitted to the portable terminal 220, and transfers the shared screen to a screen transmitter 408. The screen transmitter 408 transmits the shared screen to the portable terminal 220. On the other hand, an operation instruction receiver 409 received an operation instruction that has been input by the user and transmitted by the portable terminal 220. The operation instruction receiver 409 transfers the received operation instruction to the education application executor 407. The education application executor 407 outputs, to a USB device driver executor 410, an instruction to drive the device 230 so as to perform the operation of the device 230 according to the operation instruction.

The device controller 212 also includes the USB device driver executor 410 that executes the device driver selected by the program selector 211. The USB device driver executor 410 generates a USB packet for the device connected to a USB connector via the portable terminal 220, and transfers the USB packet to a USB packet encapsulator 411. The USB packet encapsulator 411 IP-encapsulates the USB packet, and transmits it to the portable terminal 220. On the other hand, a USB packet decapsulator 412 receives an IP-encapsulated message transmitted from the portable terminal 220, and decapsulates the message to extract a USB packet. The USB packet encapsulator 411 transfers the USB packet to the education application executor 407. The USB device driver executor 410 analyzes the received USB packet, and generates a new USB packet to respond to the device or reports the status of the device 230 to the education application executor 407.

Note that the device controller 212 is desirably formed from one virtual PC so that a plurality of PCs and devices respectively connected to portable terminals share a screen. For the sake of simplicity, FIG. 4 shows the descriptor receiver 402 separately from the device controller 212. However, the descriptor receiver 402 may be incorporated in the device controller 212.

<<Functional Arrangement of Portable Terminal>>

Figure 5:
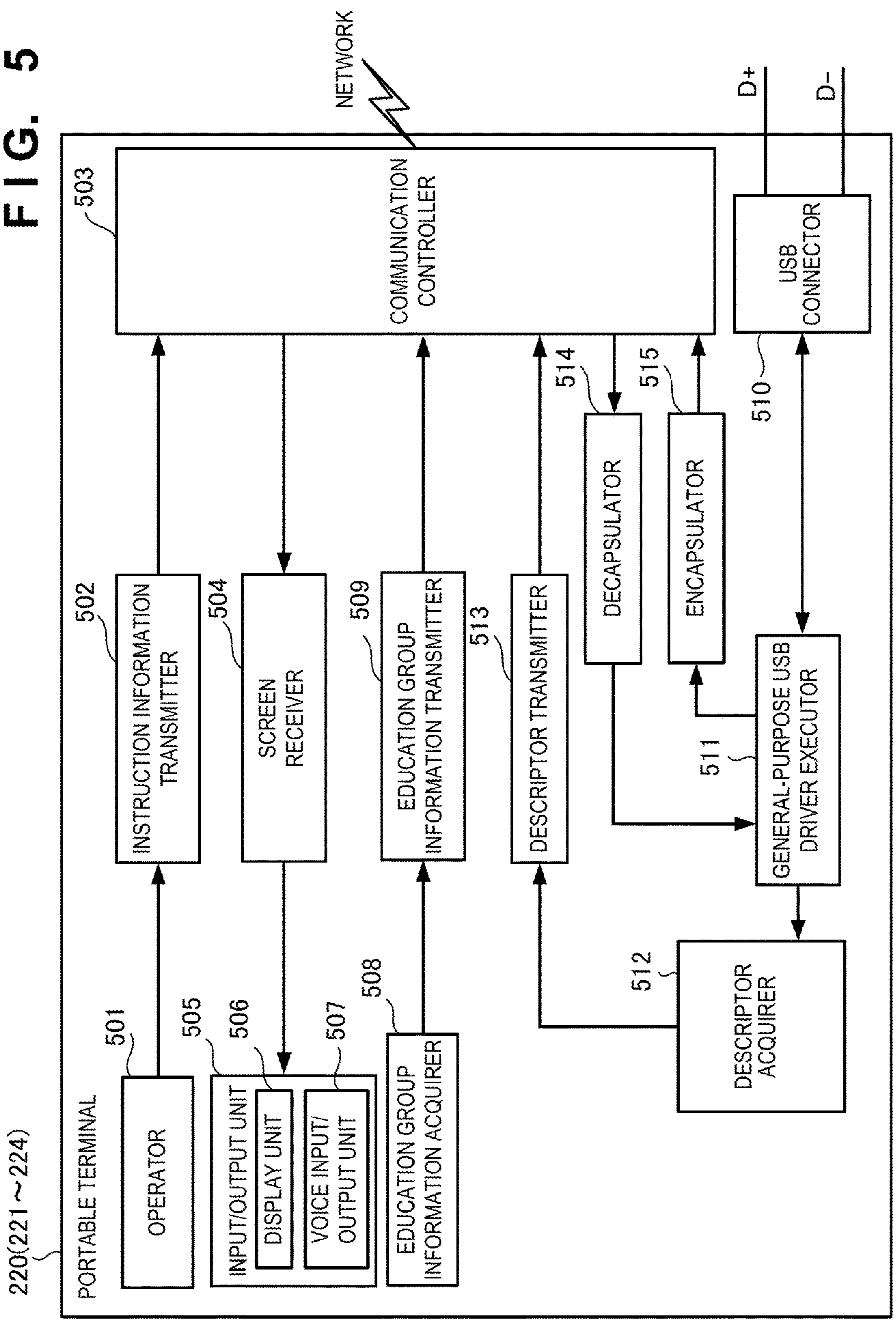
FIG. 5 is a block diagram showing the functional arrangement of a portable terminal according to the second embodiment of the present invention.

FIG. 5 is a block diagram showing the functional arrangement of the portable terminals 220 and 221 to 224 according to this embodiment. Since all the portable terminals have the same arrangement, the portable terminal 220 will be representative of them in the following description.

The portable terminal 220 according to this embodiment includes a communication controller 503 for controlling communication with the cloud server 210 via the network. The portable terminal 220 also includes an operator 501 formed from a touch panel, a keyboard, and the like, and an input/output unit 505. The input/output unit 505 includes a display unit 506 that displays a shared screen received by a screen receiver 504 from the cloud server 210, and a voice input/output unit 507 that inputs/outputs a voice.

The portable terminal 220 also includes an education group information acquirer 508 that acquires education group information of a device connected to a USB connector 510. An education group information transmitter 509 transmits the education group information acquired by the education group information acquirer 508 to the cloud server 210. Note that the education group information acquirer 508 may be provided in the operator 501. Alternatively, the education group information acquirer 508 may be a camera, a microphone, or a position generator using a GPS (Global Positioning System).

Furthermore, the portable terminal 220 includes the USB connector 510 serving as a device connector for connecting a USB device. The portable terminal 220 includes a general-purpose USB driver executor 511 used to acquire the descriptors of the device 230 connected to the USB connector 510. In addition, the portable terminal 220 includes a descriptor acquirer 512 that acquires the descriptors of the device 230 from a USB packet acquired by the general-purpose USB driver executor 511. The portable terminal 220 includes a descriptor transmitter 513 serving as a device information transmitter that transmits the descriptors of the device 230 acquired by the descriptor acquirer 512 to the cloud server 210.

The portable terminal 220 includes a decapsulator 514 and an encapsulator 515 that are used to exchange, via the general-purpose USB driver executor 511, a USB packet between the cloud server 210 and the device 230 connected to the USB connector 510. The decapsulator 514 decapsulates an IP message from the cloud server 210. The encapsulator 515 IP-encapsulates data to the cloud server 210. The general-purpose USB driver executor 511, decapsulator 514, and encapsulator 515 form a device control relay unit.

(Device DB)

FIG. 6A is a table showing the structure of the device DB 213 according to this embodiment. Note that the structure of the device DB 213 is not limited to that shown in FIG. 6A.

The device DB 213 stores a device ID 612, a device model 613, a device version 614, and a device capability 615 in association with a device descriptor 611. The device descriptor 611 includes a device class, device subclass, vendor ID, product ID, and serial number.

(Device Descriptor)

FIG. 6B is a table showing the structure of the device descriptor 611 according to this embodiment. A detailed description will be omitted. See USB specifications.

For example, a field at offset "4" indicates the device class, a field at offset "5" indicates the device subclass, a field at offset "8" indicates the vendor ID, a field at offset "10" indicates the product ID, and a field at offset "16" indicates the serial number. Based on the pieces of information, each device 230 connected to a USB connector is uniquely specified. Note that the device descriptor 611 is stored in advance in the reserved endpoint 0 area.

(Education Application DB)

FIG. 7 is a table showing the structure of the education application DB 214 according to this embodiment. Note that the structure of the education application DB 214 is not limited to that shown in FIG. 7.

The education application DB 214 stores education application contents 702 in association with an education application ID 701. The education application DB 214 also stores, in association with the education application ID 701, a first education group 703, a second education group 704, . . . , an nth education group 705 that use the education application. As information of each education group, the ID of the education group, a position range (for example, a classroom), a time period, and the like are stored.

(Device Driver DB)

FIG. 8 is a table showing the structure of the device driver DB 215 according to this embodiment. Note that the structure of the device driver DB 215 is not limited to that shown in FIG. 8.

The device driver DB 215 stores an education application ID 803 used by an education group to which a device belongs in association with a device ID 801 and device information 802. The device driver DB 215 stores a use driver 804 appropriate for each set of the device ID 801 and education application ID 803.

<<Hardware Arrangement of Cloud Server>>

Figure 9:
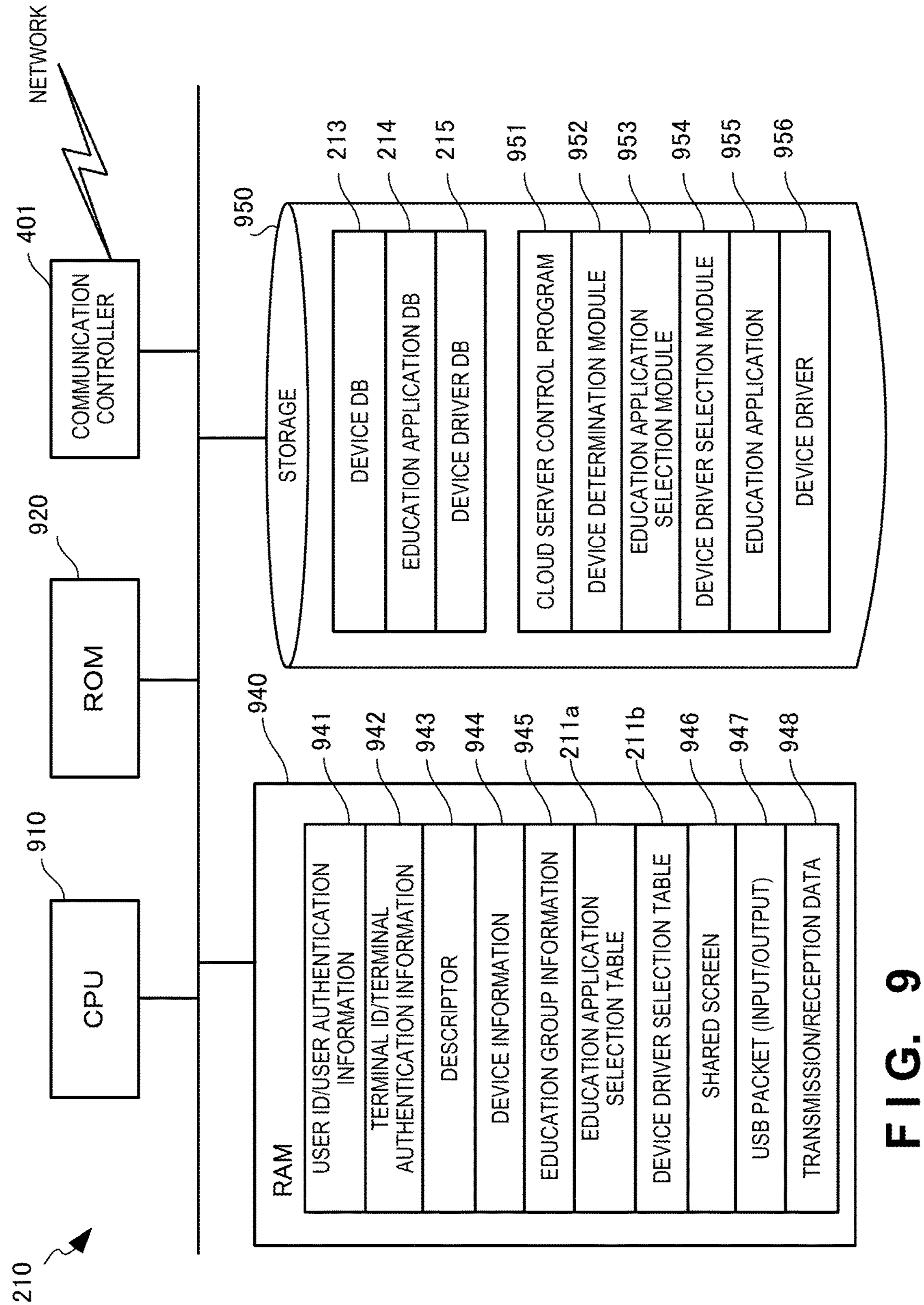
FIG. 9 is a block diagram showing the hardware arrangement of the cloud server according to the second embodiment of the present invention.

FIG. 9 is a block diagram showing the hardware arrangement of the cloud server 210 according to this embodiment.

In FIG. 9, a CPU (Central Processing Unit) 910 is a calculation control processor, and implements each functional component of the cloud server 210 shown in FIG. 4 by executing a program. A ROM (Read Only Memory) 920 stores programs and permanent data such as initial data and programs. The communication controller 401 is a communication controller that communicates with the portable terminals 220 and 221 to 22*n* via the network 260 in this embodiment. Note that the number of CPUs 910 is not limited to one, and a plurality of CPUs may be included or a GPU (Graphics Processing Unit) for image processing may be included.

A RAM (Random Access Memory) 940 is a random access memory used as a work area by the CPU 910 to temporarily store data. In the RAM 940, an area for storing data necessary for implementing this embodiment is reserved. User ID/user authentication information 941 includes the identifier and authentication information of the user who currently performs communication. Terminal ID/terminal authentication information 942 includes the identifier and authentication information of a portable terminal that currently performs communication. A descriptor 943 is a device descriptor acquired by the portable terminal from a device connected to the portable terminal and transmitted to the cloud server 210. Device information 944 is information for identifying the device by referring to the device DB 213 based on the descriptor 943. Education group information 945 is information about an education group to which the device or portable terminal belongs, that has been received from the portable terminal. The education application selection table 211*a* is a table used to select, based on the device information 944 and education group information 945, an education application to be provided. The device driver selection table 211*b* is a table used to select, based on the device information 944 and the selected education application, a device driver to be used. A shared screen 946 is data of a shared screen to be displayed on the display screen of the PC or a display screen connected to the portable terminal. A USB packet (input/output) 947 is packet data to be exchanged with the USB device via the portable terminal. Transmission/reception data 948 is IP-encapsulated data to be transmitted/received to/from the portable terminal via the communication controller 401.

A storage 950 stores databases and various parameters, or the following data or programs necessary for implementing this embodiment. The device DB 213 is the database shown in FIG. 6A. The education application DB 214 is the database shown in FIG. 7. The device driver DB 215 is the database shown in FIG. 8.

The storage 950 stores the following programs. A cloud server control program 951 is a program for controlling the cloud server 210 as a whole. A device determination module 952 is a module that specifies a device connected to a portable terminal based on the descriptors of the device in the cloud server control program 951. An education application selection module 953 is a module that selects an education application to be provided to a PC and the device connected to the portable terminal by referring to the education application DB 214 in the cloud server control program 951. A device driver selection module 954 is a module that selects a device driver for driving the device connected to the portable terminal by referring to the device driver DB 215 in the cloud server control program 951. An education application 955 is a program selected by the education application selection module 953. A device driver 956 is a program selected by the device driver selection module 954.

Note that in the RAM 940 and storage 950 of FIG. 9, data and programs associated with the general-purpose functions and other feasible functions of the cloud server 210 are not shown.

(Education Application Selection Table)

FIG. 10A is a table showing the structure of the education application selection table 211*a* according to this embodiment. The education application selection table 211*a* is a table used to select, based on a device and an education group, an education application to be provided.

The education application selection table 211*a* stores an education group ID 1013 specified based on a device ID 1011, a device position 1012, and the like. The education application selection table 211*a* stores an education application 1014 to be provided and a current playback position 1015 in association with the education group ID 1013.

(Device Driver Selection Table)

FIG. 10B is a table showing the structure of the device driver selection table 211*b* according to this embodiment. The device driver selection table 211*b* is a table used to select an appropriate device driver based on a device and a selected education application.

The device driver selection table 211*b* stores a use driver 1024 and a use parameter 1025 in association with a device ID 1021, device information 1022, a selected education application 1023.

<<Processing Procedure of Cloud Server>>

Figure 11:
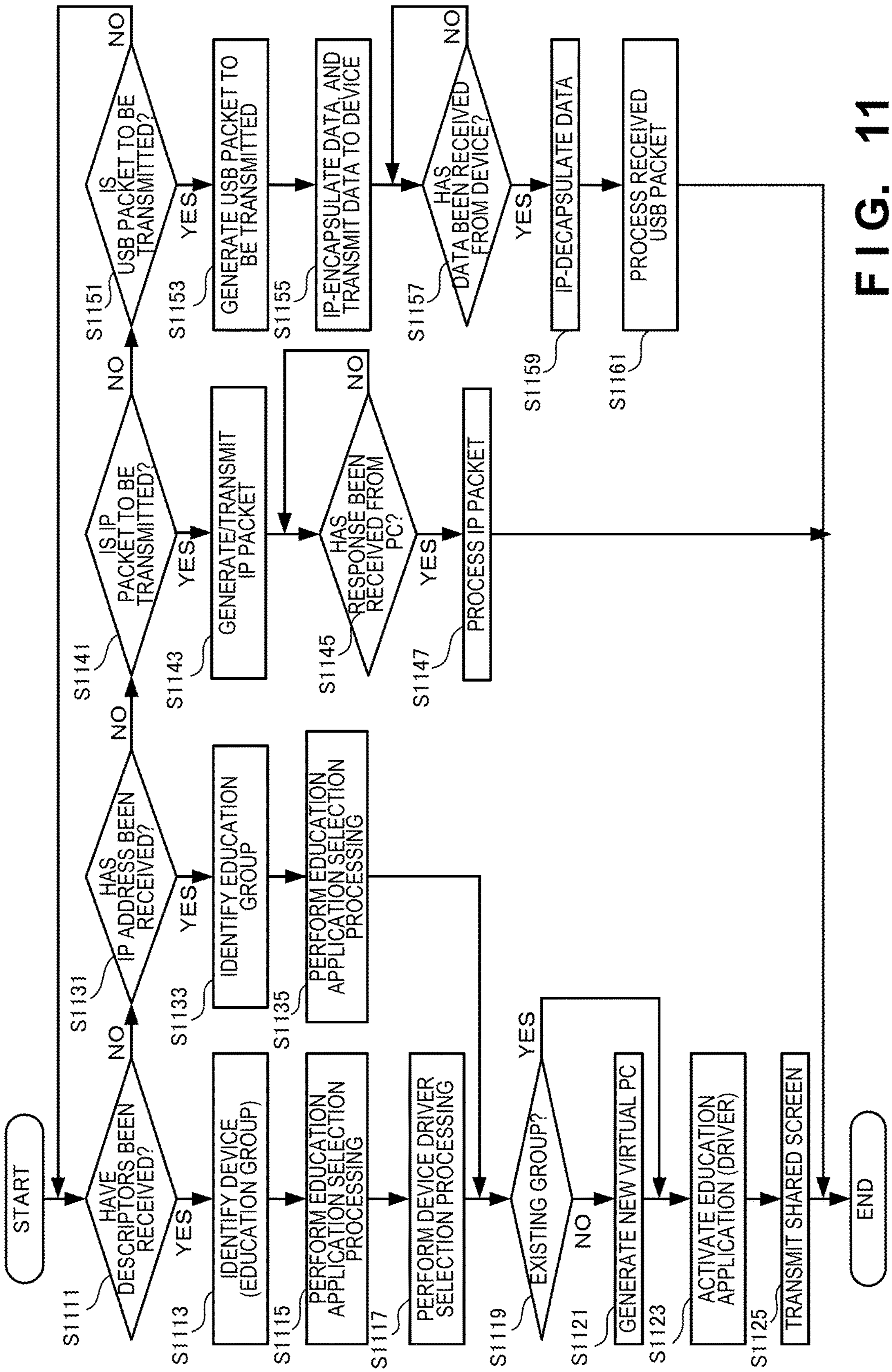
FIG. 11 is a flowchart illustrating the processing procedure of the cloud server according to the second embodiment of the present invention.

FIG. 11 is a flowchart illustrating the processing procedure of the cloud server 210 according to this embodiment. The flowchart is executed by the CPU 910 of FIG. 9 using the RAM 940, thereby implementing each functional component of FIG. 4.

In step S1111, the cloud server 210 determines whether the descriptors of a connected device have been received from a portable terminal. If the descriptors of a device have not been received, in step S1131 the cloud server 210 determines whether an IP address has been received from a PC. If the descriptors of a device have not been received and no IP address has been received from a PC, in step S1141 the cloud server 210 determines whether to transmit an IP packet to a PC. If the descriptors of a device have not been received, no IP address has been received from a PC, and no IP packet is transmitted to a PC, in step S1151 the cloud server 210 determines whether to transmit a USB packet to a device via a portable terminal.

If the descriptors of a device have been received, the process advances to step S1113, and the cloud server 210 specifies the device (in this embodiment, a general-purpose input/output device for ICT education or a special device such as a microscope or telescope) by referring to the device DB 213. At the same time, the cloud server 210 specifies an education group based on device information, position information, and the like. In step S1115, the cloud server 210 performs education application selection processing based on the device information and education group information. In step S1117, based on the device information and the selected education application, the cloud server 210 selects a device driver to be used.

In step S1119, the cloud server 210 determines whether the education group is an existing group. If the education group is not an existing group, the process advances to step S1121, and the cloud server 210 generates a virtual PC for the new education group (this makes it possible to readily share a screen in the same education group). If the education group is an existing group, the cloud server 210 assigns the device connected to the portable terminal as the input/output device of an already generated virtual PC. In step S1123, the cloud server 210 activates the selected education application and driver. In step S1125, the cloud server 210 transmits a shared screen to a PC and the device connected to the portable terminal, which belong to the same education group.

If an IP address has been received from a PC, the process advances to step S1133, and the cloud server 210 specifies an education group based on the IP address, position information, and the like. In step S1135, the cloud server 210 performs processing of selecting an education application corresponding to the specified education group. The process then advances to step S1119, and the cloud server 210 performs the processing up to step S1125. Note that in this case, the cloud server 210 does not activate the device driver in step S1123. The PC activates the device driver.

If an IP packet is transmitted to a PC, the process advances to step S1143, and the cloud server 210 generates and transmits an IP packet to the PC. In step S1145, the cloud server 210 stands by for a response from the PC. When a response is received from the PC, the process advances to step S1147, and the cloud server 210 processes the IP packet of the received response.

If a USB packet is transmitted to a device, the process advances to step S1153, and the cloud server 210 generates a USB packet to be transmitted. In step S1155, the cloud server 210 IP-encapsulates the USB packet, and transmits it to the device. In step S1157, the cloud server 210 stands by for reception of a response from the device. When a response is received, the process advances to step S1159. In step S1159, the cloud server 210 IP-decapsulates the received data to extract a USB packet. In step S1161, the cloud server 210 processes the extracted USB packet.

<<Hardware Arrangement of Portable Terminal>>

Figure 12:
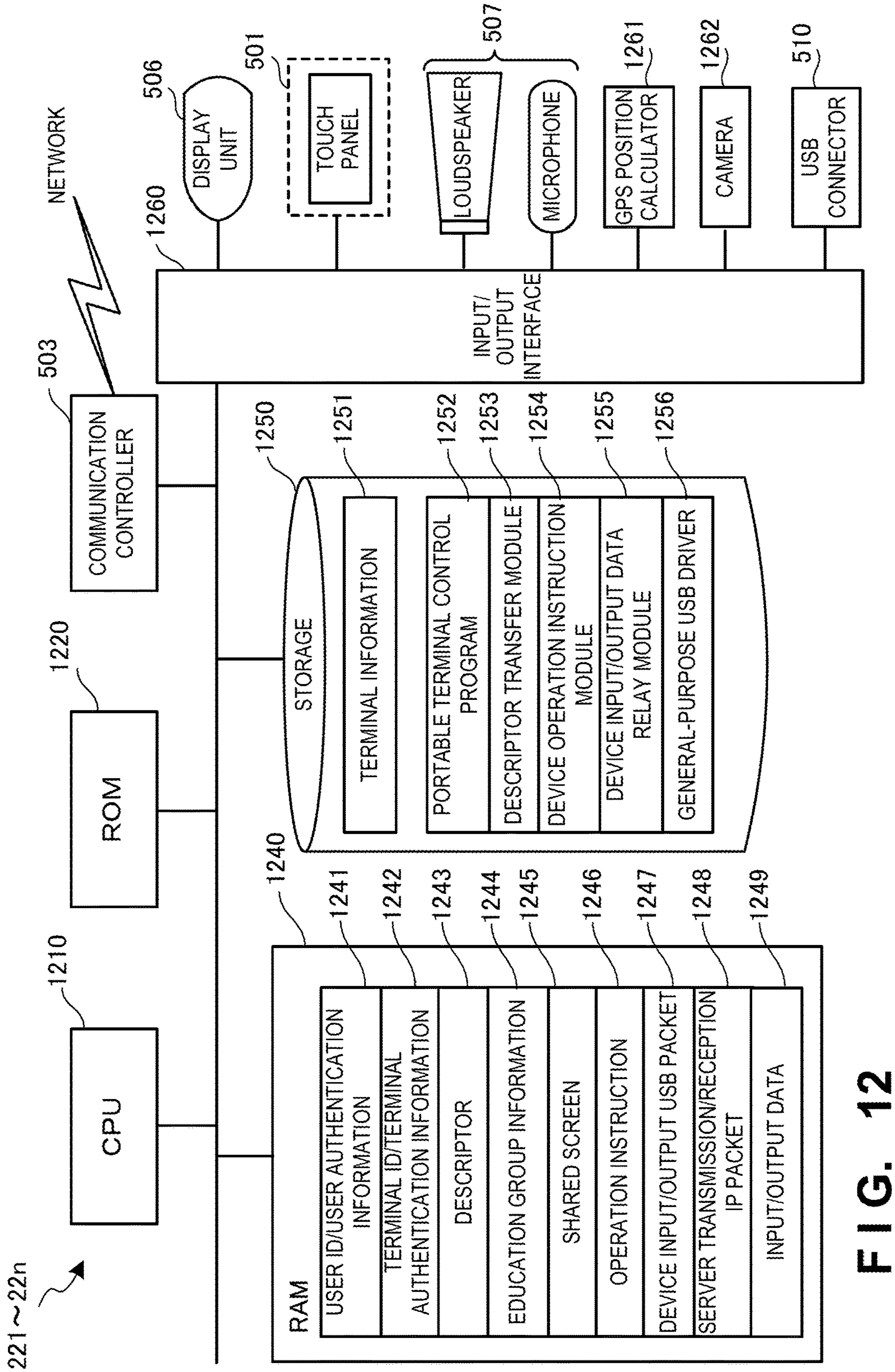
FIG. 12 is a block diagram showing the hardware arrangement of the portable terminal according to the second embodiment of the present invention.

FIG. 12 is a block diagram showing the hardware arrangement of each of the portable terminals 221 to 22*n* according to the embodiment. The portable terminal 220 will be representative of the portable terminals in the following description.

Referring to FIG. 12, a CPU 1210 is a calculation control processor, and implements each functional component of the portable terminal 220 of FIG. 5 by executing a program. A ROM 1220 stores programs and permanent data such as initial data and programs. The communication controller 503 is a communication controller that communicates with the cloud server 210 via the network in this embodiment. Note that the number of CPUs 1210 is not limited to one, and a plurality of CPUs may be included or a GPU for image processing may be included.

A RAM 1240 is a random access memory used as a work area by the CPU 1210 to temporarily store data. In the RAM 1240, an area for storing data necessary for implementing this embodiment is reserved. User ID/user authentication information 1241 includes the identifier and authentication information of the user who currently uses the portable terminal 220. Terminal ID/terminal authentication information 1242 includes the identifier and authentication information of the portable terminal 220. A descriptor 1243 is device information read out from the device connected to the USB connector 510. Education group information 1244 is information about an education group to which the device or portable terminal belongs, that has been acquired by the portable terminal 220. A shared screen 1245 is the display data of a shared screen received from the cloud server 210. An operation instruction 1246 is data of an operation instructed by the user. A device input/output USB packet 1247 is a packet to be input/output to/from the USB device. A server transmission/reception IP packet 1248 is an IP-encapsulated packet to be transmitted/received to/from the cloud server 210 via the communication controller 503. Input/output data 1249 indicates input/output data input/output via an input/output interface 1260.

A storage 1250 stores databases and various parameters, or the following data or programs necessary for implementing this embodiment. Terminal information 1251 is information including the identifier of the portable terminal. The storage 1250 stores the following programs. A portable terminal control program 1252 is a control program for controlling the portable terminal 220 as a whole. A descriptor transfer module 1253 is a module that transfers the descriptors acquired from the device 230 to the cloud server 210 in the portable terminal control program 1252. A device operation instruction module 1254 is a module that instructs the cloud server 210 to operate the device 230. A device input/output data relay module 1255 is a module that relays the input/output of data between the cloud server 210 and the device 230. A general-purpose USB driver 1256 is a program for executing a basic USB protocol such as readout of the descriptors of the device 230.

The input/output interface 1260 interfaces input/output data with the input/output device. The display unit 506 and the operator 501 formed from the touch panel and the like are connected to the input/output interface 1260. The voice input/output unit 507 including a loudspeaker and microphone is also connected to the input/output interface 1260. Furthermore, a GPS position generator 1361, a camera 1362, and the like are connected. The USB connector 510 is also connected.

Note that in the RAM 1240 and storage 1250 of FIG. 12, data and programs associated with the general-purpose functions and other feasible functions of the cloud server 210 are not shown.

<<Processing Procedure of Portable Terminal>>

Figure 13:
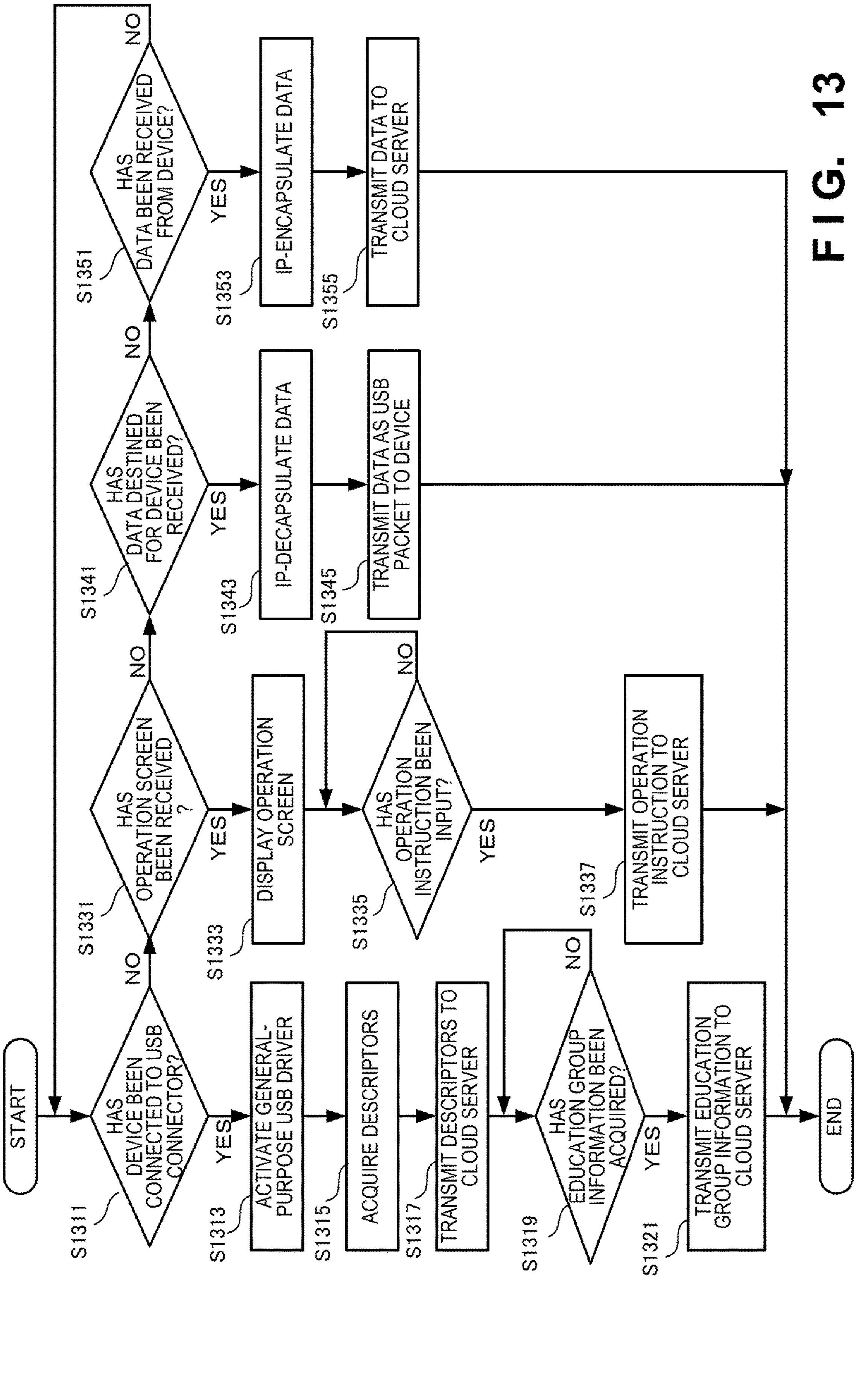
FIG. 13 is a flowchart illustrating the processing procedure of the portable terminal according to the second embodiment of the present invention.

FIG. 13 is a flowchart illustrating the processing procedure of each of the portable terminals 221 to **22*n* according to this embodiment. The flowchart is executed by the CPU 1210 of FIG. 12 using the RAM 1240, thereby implementing each functional component of FIG. 5. The portable terminal 221** will be representative of the portable terminals in the following description.

In step S1311, the portable terminal 221 determines whether a device has been connected to the USB connector. If no device has been connected to the USB connector, the portable terminal 221 determines in step S1331 whether an operation screen has been received from the cloud server 210. If no device has been connected to the USB connector and no operation screen has been received, the portable terminal 221 determines in step S1341 whether data destined for a device has been received from the cloud server 210. If no device has been connected to the USB connector, no operation screen has been received, and no data destined for a device has been received, the portable terminal 221 determines in step S1351 whether data has been received from a device.

If a device has been connected to the USB connector, the process advances to step S1313, and the portable terminal 221 activates a general-purpose USB drive. In step S1315, the portable terminal 221 acquires the descriptors of the device. In step S1317, the portable terminal 221 transmits the acquired descriptors to the cloud server 210. In step S1319, the portable terminal 221 stands by for acquisition of education group information. Upon acquiring education group information, the process advances to step S1321, and the portable terminal 221 transmits the acquired education group information to the cloud server 210.

If an operation screen has been received, the process advances to step S1333, and the portable terminal 221 displays the operation screen on the display unit 506. In step S1335, the portable terminal 221 stands by for an operation input by the user. When an operation input is received from the user, the process advances to step S1337, and the portable terminal 221 transmits an operation instruction to the cloud server 210.

If data destined for a device has been received, the process advances to step S1343, and the portable terminal 221 IP-decapsulates the received IP-encapsulated data. In step S1345, the portable terminal 221 transmits a USB packet to the device. On the other hand, if data has been received from a device, the process advances to step S1353, and the portable terminal 221 IP-encapsulates the received USB packet. In step S1355, the portable terminal 221 transmits an IP packet to the cloud server 210.

According to this embodiment, a lack of hardware resources is readily replenished or a device failure is readily recovered. This makes it possible to readily implement ICT education while suppressing the load in the field of education.

Third Embodiment

An information processing system according to the third embodiment of the present invention will be described. The information processing system according to this embodiment is different from that in the second embodiment in that continuous processing from the previous end point is implemented at the time of resumption of an education application by saving the history of the curriculum of the education application. Since other components and operations are the same as in the second embodiment, the same reference numerals and symbols denote the same components and operations and a detailed description thereof will be omitted.

According to this embodiment, even if a change occurs, such as a change in teacher, it is possible to readily maintain the continuity in ICT education while suppressing the load in the field of education.

Note that in this embodiment, the continuity of an education application is indicated as the continuity in ICT education. However, for example, it is possible to maintain the continuity by saving device adjustment data of a special device such as a microscope or telescope. In this case, device adjustment data is saved in a history saving DB 1416 (to be described later) in association with device information.

<<Information Processing System>>

The operation of an information processing system 1400 will be described with reference to FIGS. 14 and 15.

(Concept of Operation)

Figure 14:
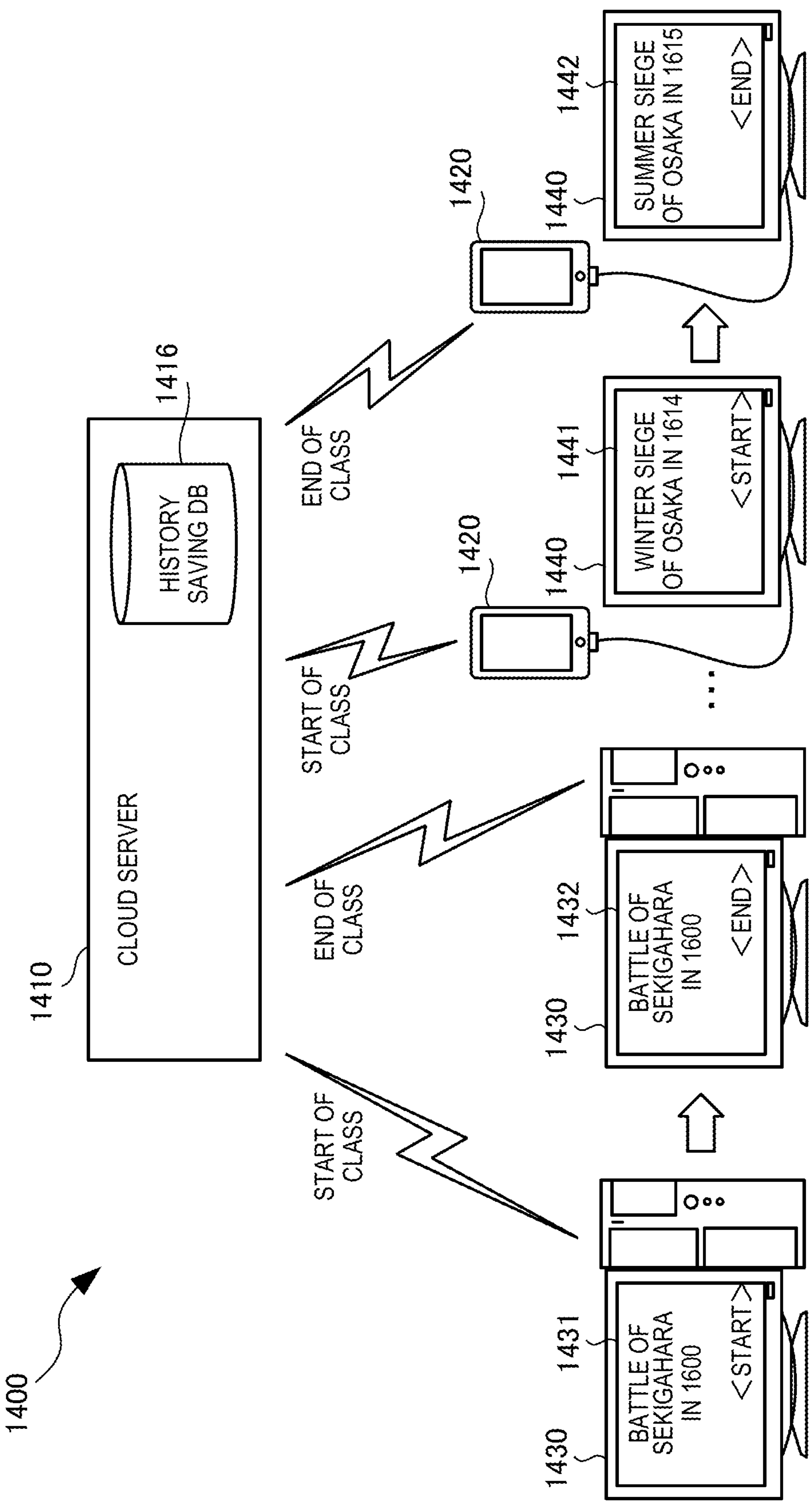
FIG. 14 is a view for explaining the concept of the operation of an information processing system according to the third embodiment of the present invention.

FIG. 14 is a view for explaining the concept of the operation of the information processing system 1400 according to this embodiment.

FIG. 14 shows a case in which a cloud server 1410 includes the history saving DB 1416 for saving a providing history of an education application, and a shared screen for the education application is continuously provided in different time periods. The shared screen changes from left to right. The left two views show images of the education application provided in a given time period. The right two screens show images of the education application in a different time period (in this example, the next class of the same Japanese history). Although the left two views are provided on the screen of a PC 1430, the right two screens are provided on a display 1440 USB-connected to a portable terminal 1420.

In the left two views, the PC 1430 provides the education application in the Japanese history class. Contents correspond to moving images indicating the Battle of Sekigahara. A leftmost screen 1431 displays the start of the Battle of Sekigahara, and a second screen 1432 from the left displays the end of the Battle of Sekigahara. Upon end of providing the education application on the second screen 1432 from the left, the cloud server 1410 saves, in the history saving DB 1416, a position where the education application has been stopped (see FIG. 17).

The right two views show an example of the same Japanese history class after a predetermined time. At the start of the class, the cloud server 1410 determines that the Battle of Sekigahara has ended in the previous class with reference to the history saving DB 1416. The cloud server 1410 starts providing videos of the Winter Siege of Osaka and the Summer Siege of Osaka as the next historical incidents. Note that in FIG. 14, since the PC 1430 which has previously output videos of the Battle of Sekigahara is unusable due to a failure or the like, the display 1440 is USB-connected to the portable terminal 1420, and the cloud server 1410 directly controls display on the display 1440. A second screen 1441 from the right starts a video of the Winter Siege of Osaka. A rightmost screen 1442 ends with the last video of the Summer Siege of Osaka.

As described above, the cloud server 1410 manages the providing schedule of the education application based on the providing history of the education application saved in the history saving DB 1416 of the cloud server 1410. It is, therefore, possible to continuously provide the education application even if a teacher having charge of a class is absent or is changed.

(Operation Procedure)

Figure 15:
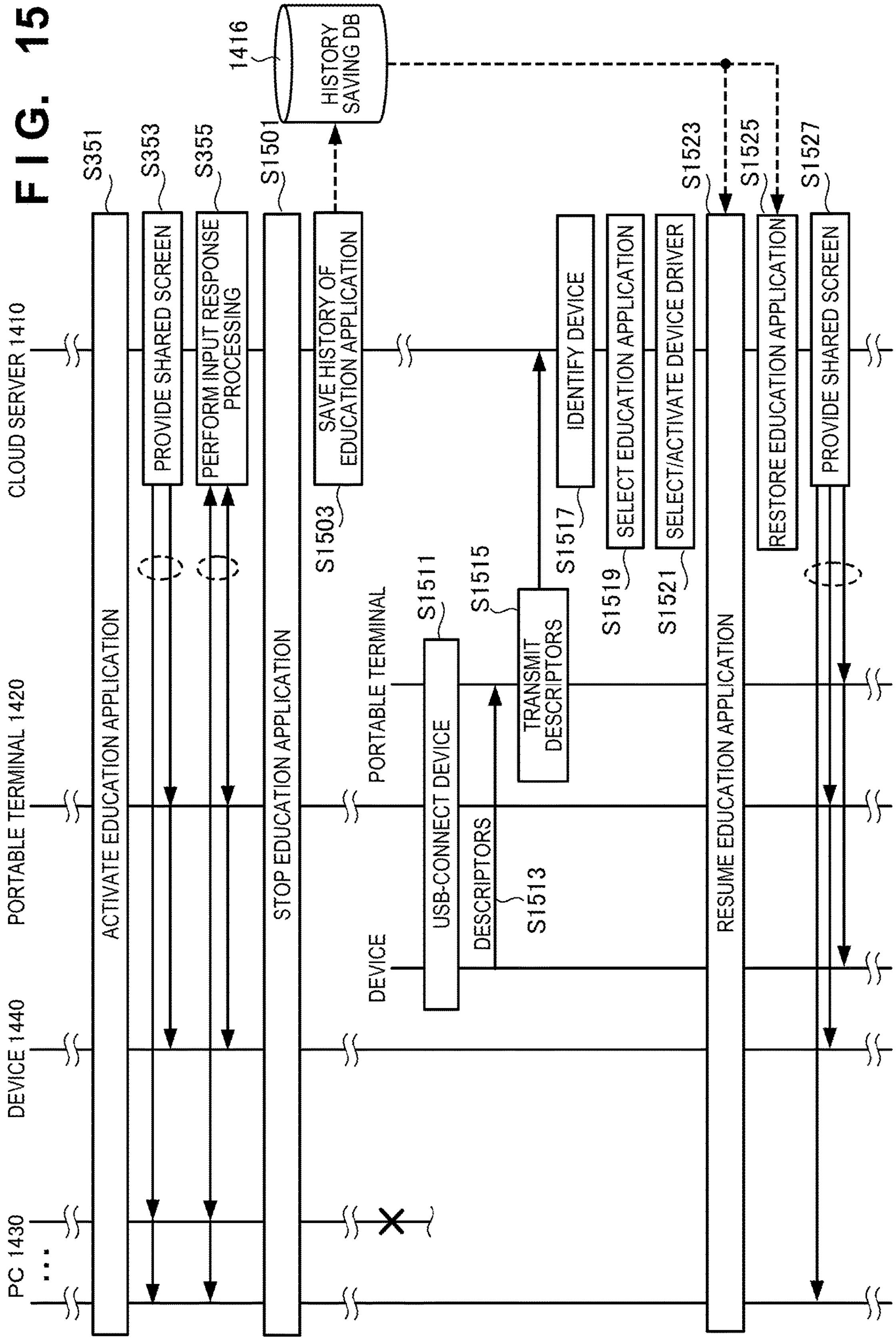
FIG. 15 is a sequence chart showing the operation procedure of the information processing system according to the third embodiment of the present invention.

FIG. 15 is a sequence chart showing the operation procedure of the information processing system 1400 according to this embodiment. Note that the same step numbers as in FIG. 3A or 3B denote the same steps and a description thereof will be omitted.

In steps S351 to S355, the education application is activated and provided. In step S1501, provision of the education application is stopped. Note that the cloud server 1410 may stop the education application by determining the completion of provided contents, or a teacher may instruct to stop the education application from his/her device. In step S1503, the cloud server 1410 saves the providing history of the education application in the history saving DB 1416.

After that, to reactivate the same education application, the following operation is performed. Note that FIG. 15 shows an example in which the same education application is reactivated for a device USB-connected to a portable terminal. In step S1511, the display 1440 is USB-connected to the portable terminal 1420. In step S1513, the portable terminal 1420 reads out descriptors from the display 1440 using a general-purpose USB driver. In step S1515, the portable terminal 1420 transmits the descriptors to the cloud server 1410. In step S1517, the cloud server 1410 specifies the connected device based on the descriptors by referring to a device DB 213. In step S1519, the cloud server 1410 determines a belonging education group based on the ID of the device and the position information of the portable terminal 1420 by referring to an education application DB 214, and selects an education application to be provided. In step S1521, the cloud server 1410 selects and activates a device driver based on the specified device and the selected education application by referring to a device driver DB 215.

In step S1523, the cloud server 1410 reactivates the education application based on the providing history of the selected education application by referring to the history saving DB 1416. In step S1525, the cloud server 1410 restores and starts the education application from the state after the education application is stopped. In step S1527, a shared screen is provided to the PC 1430 and the display 1440 USB-connected to portable terminal 1420.

<<Functional Arrangement of Cloud Server>>

Figure 16:
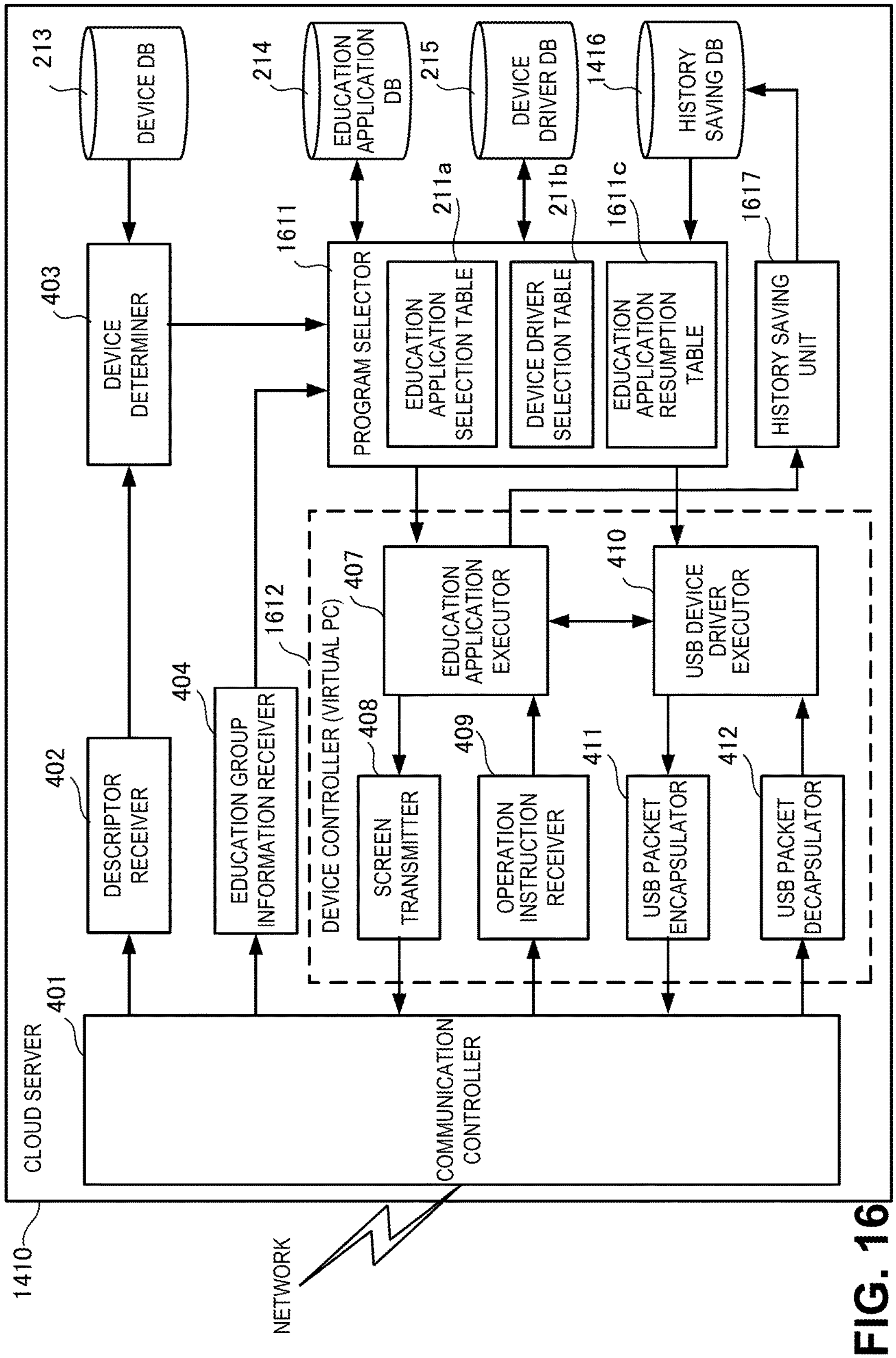
FIG. 16 is a block diagram showing the functional arrangement of a cloud server according to the third embodiment of the present invention.

FIG. 16 is a block diagram showing the functional arrangement of the cloud server 1410 according to this embodiment. Note that the same reference numerals as in FIG. 4 denote the same functional components in FIG. 16 and connections will be omitted.

When execution of an education application is stopped, an education application executor 407 of a device controller 1612 causes a history saving unit 1617 to save, in the history saving DB 1416, a history such as a position where the education application is stopped. A program selector 1611 includes an education application resumption table 1611*c*, and controls the position of resumption by referring to the history saving DB 1416 at the time of resumption of the education application.

(History Saving DB)

FIG. 17 is a table showing the structure of the history saving DB 1416 according to this embodiment. Note that the structure of the history saving DB 1416 is not limited to that shown in FIG. 17.

The history saving DB 1416 stores education application contents 1702 in association with an education application ID 1701. The history saving DB 1416 also stores, in association with each education application ID 1701, a first education group 1703, . . . , an nth education group 1704 as providing targets which are using a corresponding education application. As information of each education group, the interrupt time, interrupt position, and education group condition (classroom or the like) of the education application are stored.

(Education Application Resumption Table)

FIG. 18 is a table showing the structure of the education application resumption table 1611*c* according to this embodiment. The education application resumption table 1611*c* is used to identify a resumption position at the time of resumption of an education application.

The education application resumption table 1611*c* stores an education group ID 1802, a resumption time 1803 associated with an interrupt time, and a resumption position 1804 in association with an education application ID 1801.

<<Processing Procedure of Cloud Server>>

Figure 19:
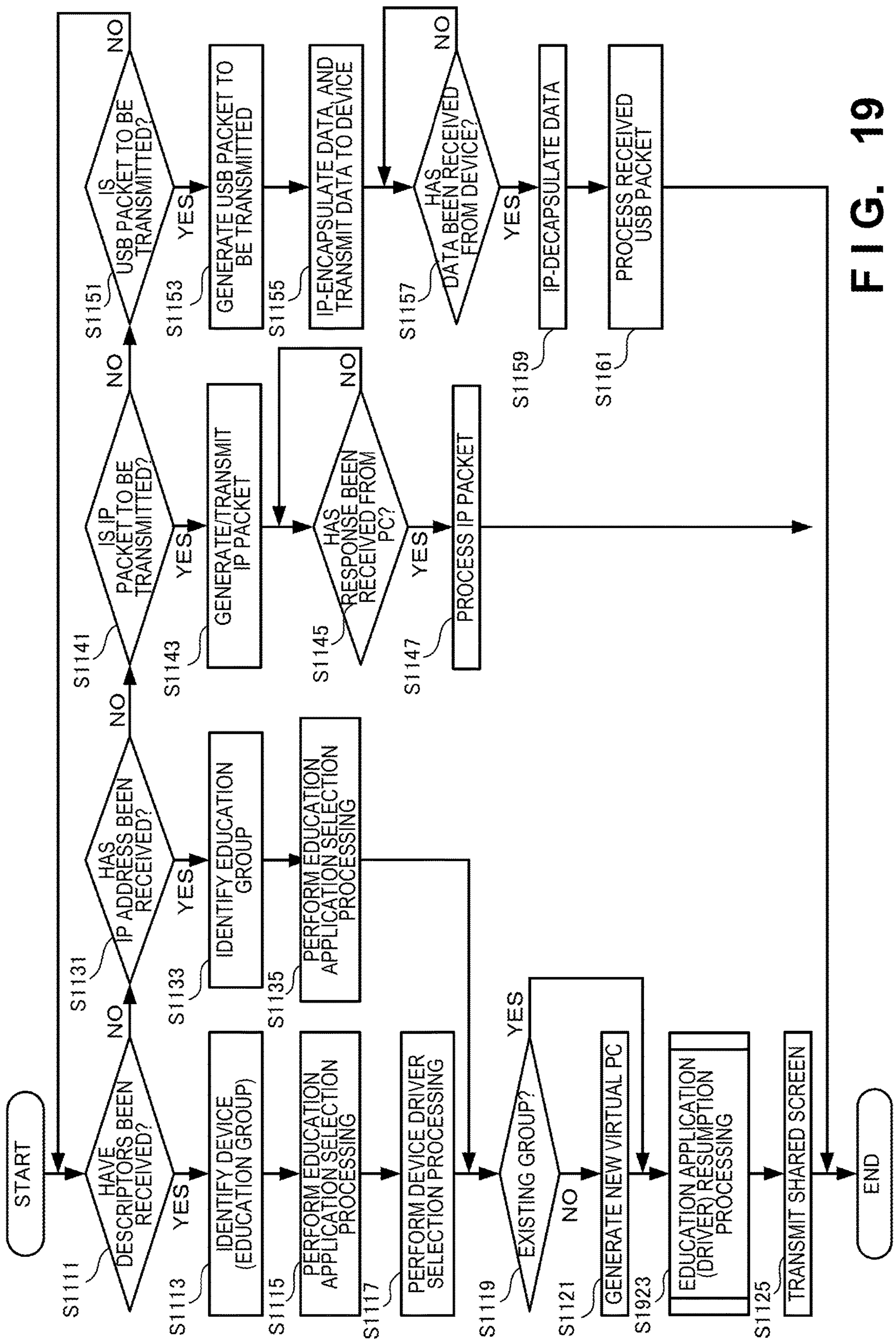
FIG. 19 is a flowchart illustrating the processing procedure of the cloud server according to the third embodiment of the present invention.

FIG. 19 is a flowchart illustrating the processing procedure of the cloud server 1410 according to this embodiment. Note that the same step numbers as in FIG. 11 of the second embodiment denote the same steps in FIG. 19 and a description thereof will be omitted.

Figure 20:
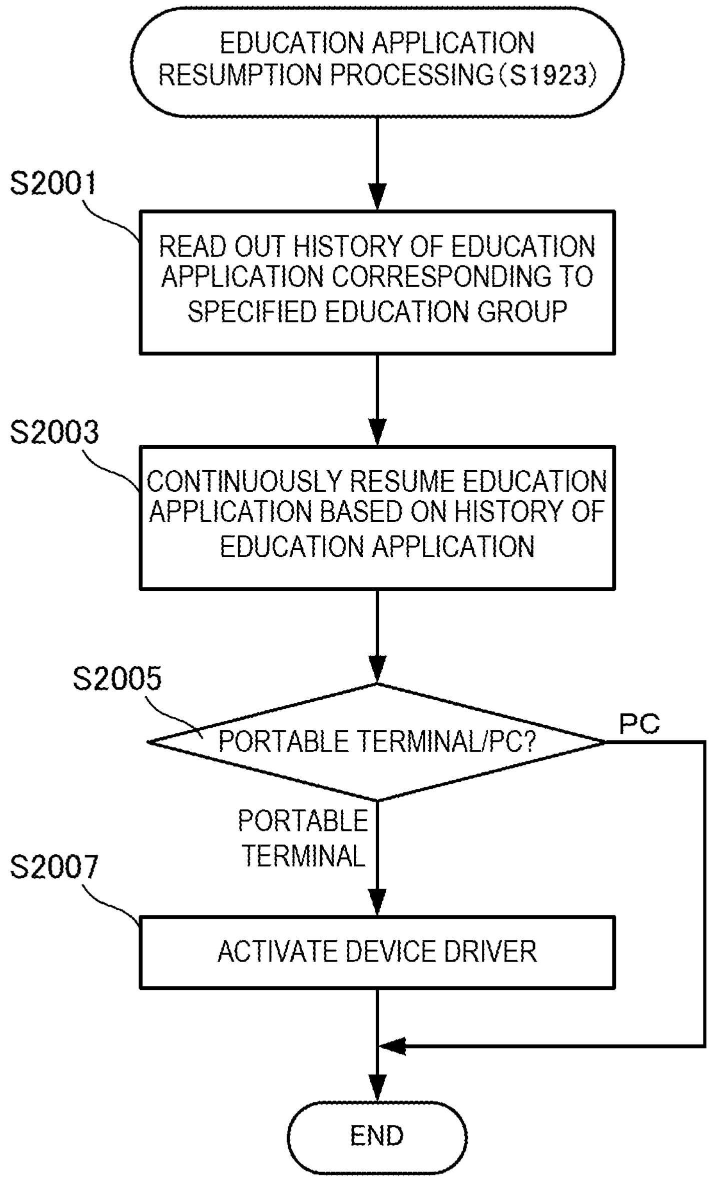
FIG. 20 is a flowchart illustrating the processing procedure of education application resumption processing according to the third embodiment of the present invention.

Referring to FIG. 19, the difference from FIG. 11 is education application (driver) activation processing by the cloud server 1410 in step S1923 (see FIG. 20). In FIG. 19, continuous resumption of the education application is controlled by referring to the history saving DB 1416.

(Education Application Resumption Processing)

FIG. 20 is a flowchart illustrating the processing procedure of the education application resumption processing in step S1923 according to this embodiment.

In step S2001, the cloud server 1410 reads out the history of an education application corresponding to a specified education group from the history saving DB 1416. In step S2003, the cloud server 1410 continuously resumes the education application based on the readout history of the education application. In step S2005, the cloud server 1410 determines whether the providing destination of the education application is a portable terminal or PC. If the providing destination is a portable terminal, the cloud server 1410 activates a selected device driver in step S2007. If the providing destination is a PC, the cloud server 1410 basically causes the PC to activate the device driver.

According to this embodiment, continuous processing from the previous end point is implemented at the time of resumption of the education application by saving the history of the curriculum of the education application. With this arrangement, even if a change such as changing of a teacher occurs, it is possible to readily maintain the continuity in ICT education while suppressing the load in the field of education.

Fourth Embodiment

An information processing system according to the fourth embodiment of the present invention will be described. The information processing system according to this embodiment is different from that in the second or third embodiment in that a cloud server estimates the status of a device and proposes a coping method to execute an education application. That is, in this embodiment, the image capturing function of a camera and the voice input function of a microphone are used as functions of a portable terminal. Information indicating the status of the device includes the video of the device, which has been captured by the camera, and the voice of the user around the device, which has been input using the microphone. Since other components and operations are the same as those in the second embodiment, the same reference numerals and symbols denote the same components and operations, and a detailed description thereof will be omitted.

According to this embodiment, it is possible to readily maintain ICT education while suppressing the load of device setting in the field of education.

<<Information Processing System>>

The operation of an information processing system 200 according to this embodiment will be described with reference to FIGS. 14 and 15.

(Concept of Operation)

Figure 21:
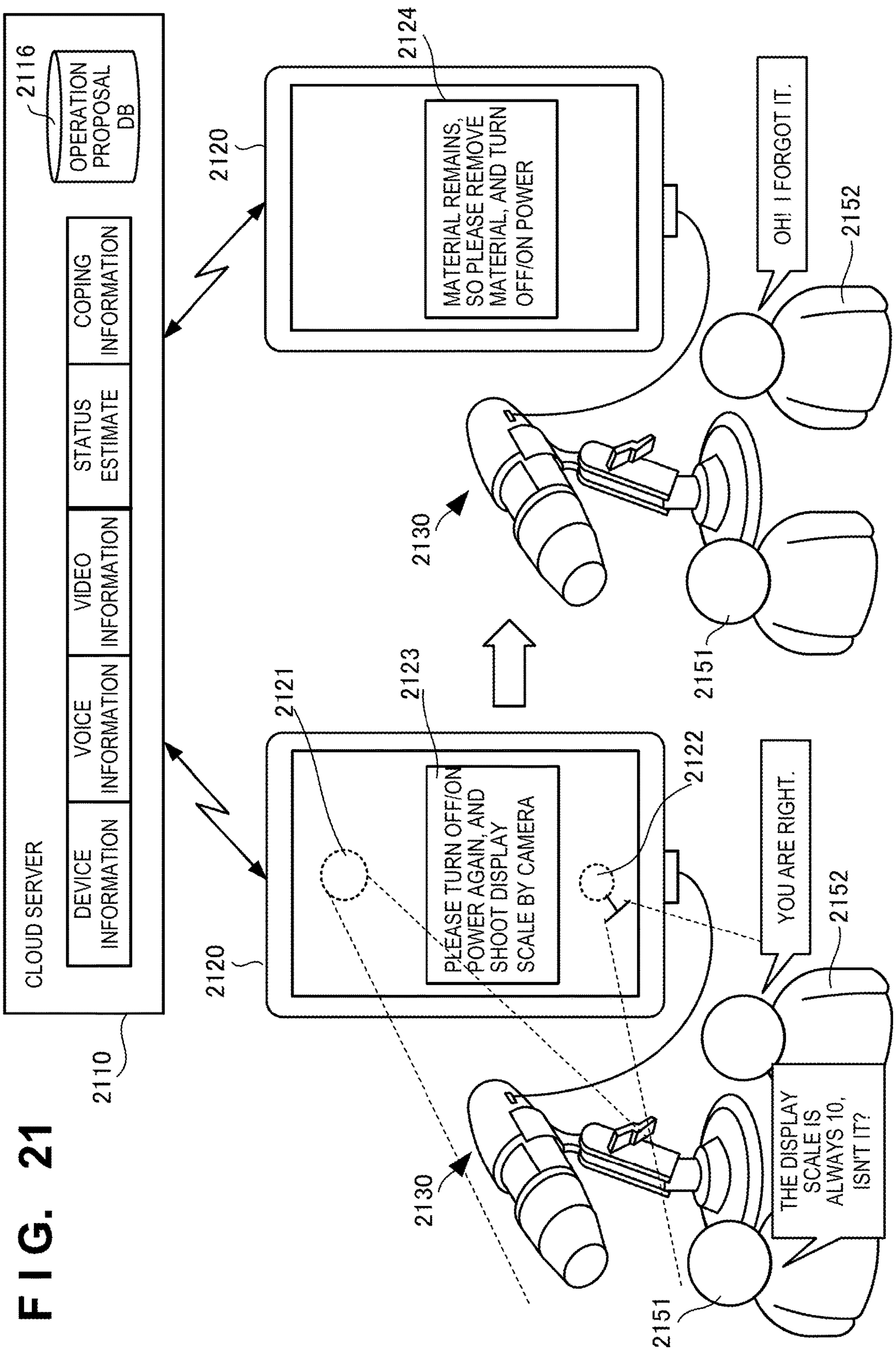
FIG. 21 is a view for explaining the concept of the operation of an information processing system according to the fourth embodiment of the present invention.

FIG. 21 is a view for explaining the concept of the operation of an information processing system 2100 according to this embodiment.

Referring to FIG. 21, a cloud server 2110 includes an operation proposal DB 2116, estimates the status of a device based on device information, the video of the device acquired by a portable terminal 2120, and the voice input around the device, generates coping information, and notifies the user of the coping information from the portable terminal 2120.

In the left view of FIG. 21, assume that a digital microscope 2130 as a device is USB-connected to the portable terminal 2120 but the digital microscope 2130 does not normally operate. In response to a question "the display scale is always 10, isn't it?" asked by a user 2151, a user 2152 answers "you are right". A microphone 2122 of the portable terminal 2120 acquires the conversation between the users. Furthermore, an instruction message "please turn off/on power again, and shoot display scale by camera" is displayed on a display screen 2123 of the portable terminal 2120 to the user. A camera 2121 captures an image of the display scale of the digital microscope 2130.

In the right view of FIG. 21, the cloud server 2110 estimates the status of the device based on the device information, voice information, and video information, generates coping information, and transmits it to the portable terminal 2120. A coping instruction "material remains, so please remove material, and turn off/on power" is displayed on a display screen 2124 of the portable terminal 2120 to the user. This instruction may be given by voice output.

As described above, the cloud server 2110 notifies, from the portable terminal 2120, the user of setting and adjustment of the device connected to the portable terminal 2120. It is thus possible to provide an education application even if the user has no technical knowledge.

(Operation Procedure)

Figure 22:
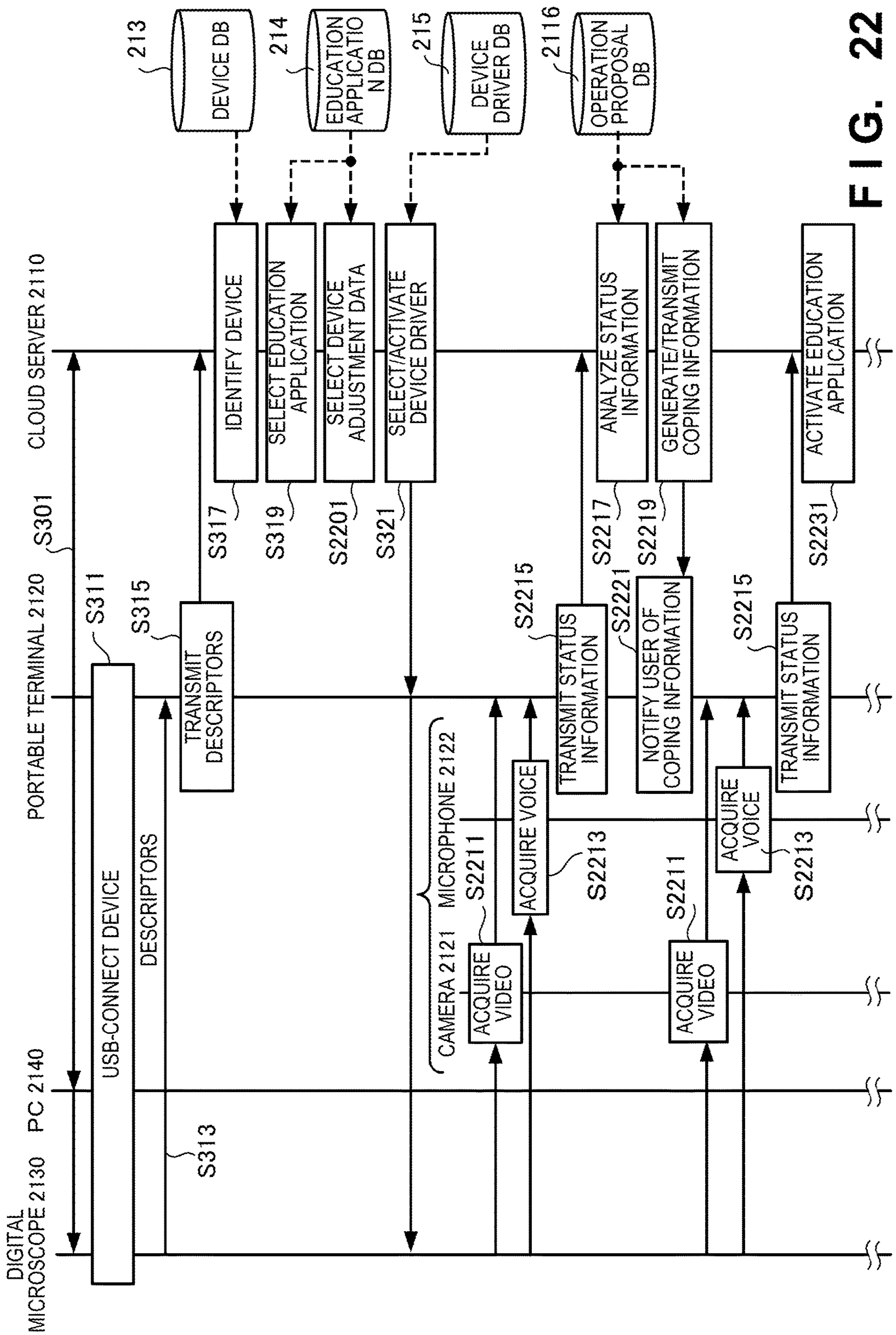
FIG. 22 is a sequence chart showing the operation procedure of the information processing system according to the fourth embodiment of the present invention.

FIG. 22 is a sequence chart showing the operation procedure of the information processing system 2100 according to this embodiment. Note that the same step numbers as in FIG. 3A or 3B denote the same steps in FIG. 22 and a description thereof will be omitted.

In step S2201, the cloud server 2110 selects device adjustment data to be set in the digital microscope 2130 in this example. After that, if the digital microscope 2130 normally operates, the cloud server 2110 controls the digital microscope 2130 via the portable terminal 2120. In FIG. 22, assume that the digital microscope 2130 does not normally operate.

In this case, in step S2211, the camera 2121 of the portable terminal 2120 is used to acquire a video of the digital microscope 2130. Note that as shown in FIG. 21, a video of a portion instructed by the cloud server 2110 may be acquired. In step S2213, the microphone 2122 of the portable terminal 2120 is used to acquire a conversation between users around the digital microscope 2130.

In step S2215, the portable terminal 2120 transmits the acquired video and voice as a device status to the cloud server 2110. Upon acquiring the device status, in step S2217 the cloud server 2110 analyzes the received status information by referring to the operation proposal DB 2116. In step S2219, the cloud server 2110 generates coping information based on the analysis result by referring to the operation proposal DB 2116, and transmits the coping information to the portable terminal 2120. In step S2221, the portable terminal 2120 notifies the user of the coping information received as an operation proposal from the cloud server 2110.

After the user performs processing according to the notified coping information, the camera 2121 of the portable terminal 2120 is used to acquire again a video of the digital microscope 2130 in step S2211. In step S2213, the microphone 2122 of the portable terminal 2120 is used to acquire a conversation between users around the digital microscope 2130. If the digital microscope 2130 normally operates (not shown) as a result of analyzing the result, in step S2231 the cloud server 2110 activates the selected education application to start an education program using the digital microscope 2130.

<<Functional Arrangement of Cloud Server>>

Figure 23:
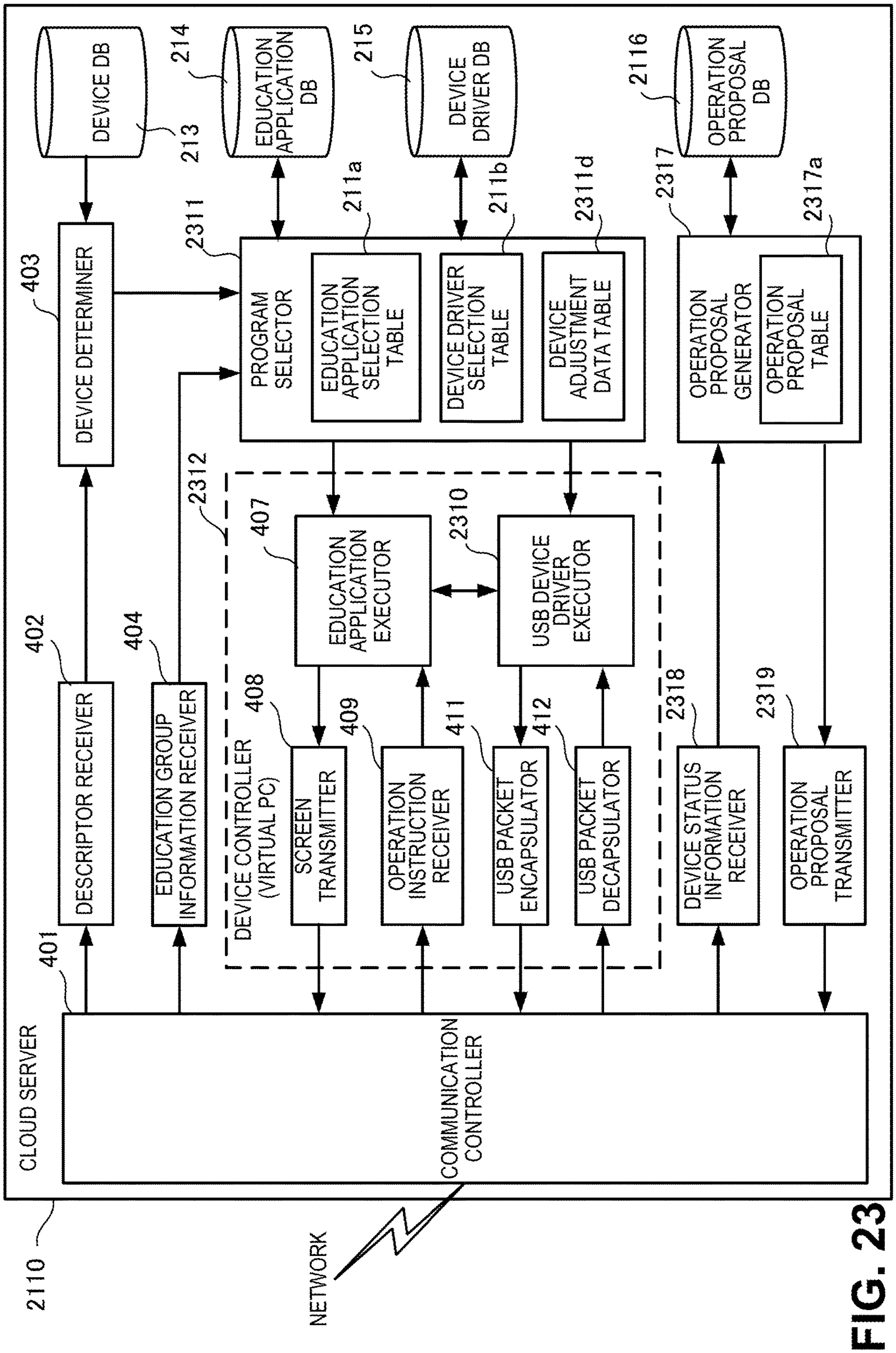
FIG. 23 is a block diagram showing the functional arrangement of a cloud server according to the fourth embodiment of the present invention.

FIG. 23 is a block diagram showing the functional arrangement of the cloud server 2110 according to this embodiment. Note that the same reference numerals as in FIG. 4 denote the same components in FIG. 23 and a description thereof will be omitted.

A program selector 2311 includes a device adjustment data table 2311*d*, and sets adjustment data of a special device such as the digital microscope 2130 of this embodiment in addition to selection of an education application and a device driver. A USB device driver executor 2310 of a device controller 2312 sets the adjustment data in a device by a USB packet. Note that the device adjustment data table 2311*d* is a table for holding the history of the adjustment data in association with a device ID, and a detailed description thereof will be omitted.

A device status information receiver 2318 receives the status of the device which has been acquired by the camera or microphone and transmitted by the portable terminal 2120. The device status information receiver 2318 transfers the device status information to an operation proposal generator 2317. The operation proposal generator 2317 includes an operation proposal table 2317*a* (see FIG. 25), analyzes the received device status information, and generates an operation proposal by referring to the operation proposal DB 2116 (see FIG. 24). An operation proposal transmitter 2319 transmits the device operation proposal generated by the operation proposal generator 2317 to the portable terminal 2120.

(Operation Proposal DB)

FIG. 24 is a table showing the structure of the operation proposal DB 2116 according to this embodiment. Note that the structure of the operation proposal DB 2116 is not limited to that shown in FIG. 24.

The operation proposal DB 2116 stores, in association with device information 2401, acquired video information 2402, a first status prediction 2403 based on analysis of the acquired video information 2402, acquired voice information 2404, and a second status prediction 2405 based on analysis of the acquired voice information 2404. The operation proposal DB 2116 stores a status estimate 2406 estimated based on a set of the first status prediction 2403 and second status prediction 2405. Furthermore, the operation proposal DB 2116 stores a coping ID and contents of announcement for the portable terminal 2120 as coping information 2407 in association with the status estimate 2406.

(Operation Proposal Table)

Figure 25:
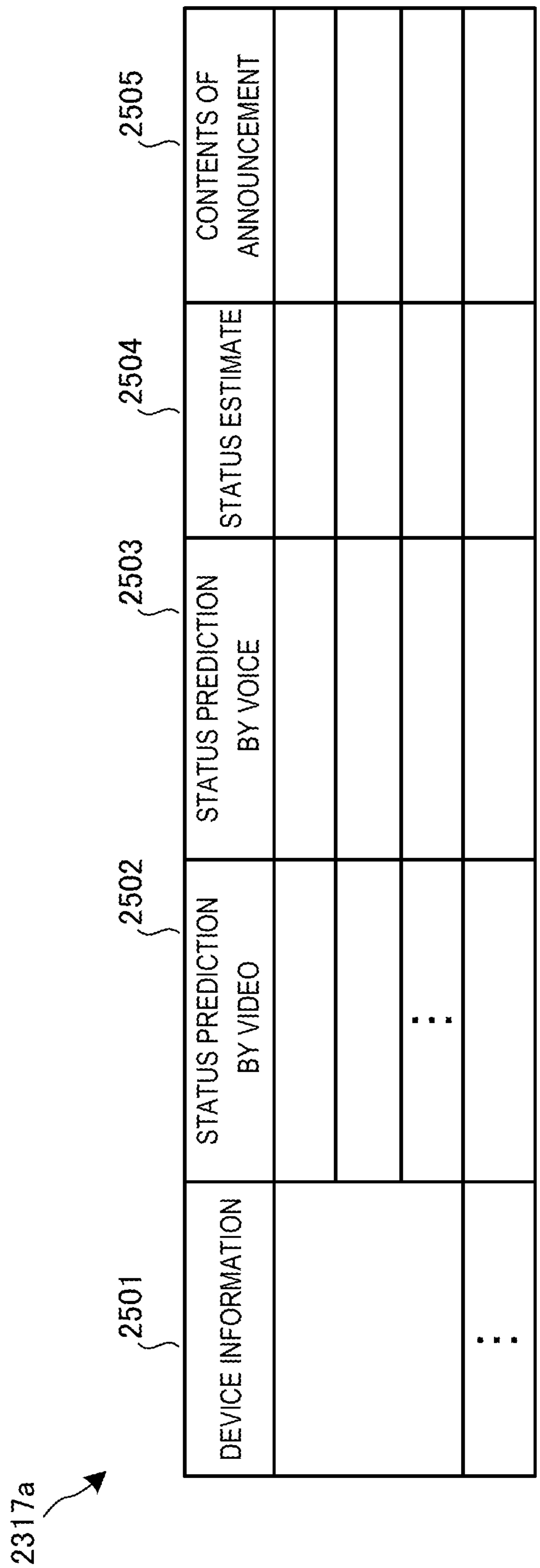
FIG. 25 is a table showing the structure of an operation proposal table according to the fourth embodiment of the present invention.

FIG. 25 is a table showing the structure of the operation proposal table 2317*a* according to this embodiment. The operation proposal table 2317*a* is a table used to generate an operation proposal by analyzing device status information transmitted by the portable terminal 2120.

The operation proposal table 2317*a* stores a set of a status prediction 2502 by a video and a status prediction 2503 by a voice in association with device information 2501. In association with the set, the operation proposal table 2317*a* stores a status estimate 2504 and contents 2505 of announcement for coping with the status estimate 2504.

<<Processing Procedure of Cloud Server>>

Figure 26:
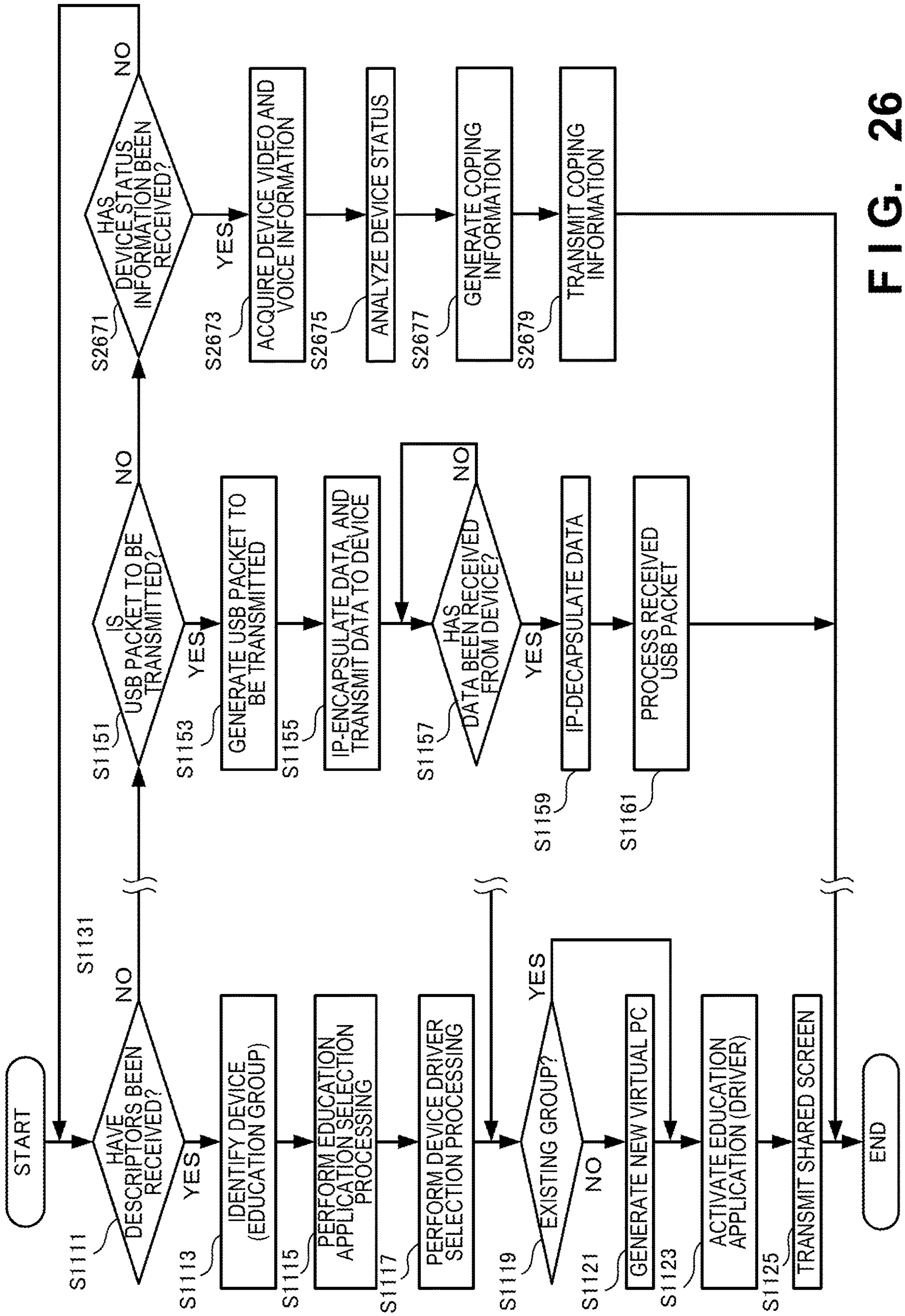
FIG. 26 is a flowchart illustrating the processing procedure of the cloud server according to the fourth embodiment of the present invention.

FIG. 26 is a flowchart illustrating the processing procedure of the cloud server 2110 according to this embodiment. Note that the same step numbers as in FIG. 11 denote the same steps in FIG. 26 and a description thereof will be omitted. Note also that processes branching at steps S1131 and S1141 of FIG. 11 are not shown in FIG. 26.

In step S2671, the cloud server 2110 determines whether device status information has been received from the portable terminal 2120. If device status information has been received, the process advances to step S2673, and the cloud server 2110 acquires device video and voice information. In step S2675, the cloud server 2110 analyzes the status of the device based on the acquired device video and voice information. In step S2677, the cloud server 2110 generates coping information for coping with the device status as an analysis result. In step S2679, the cloud server 2110 transmits the generated coping information to the portable terminal 2120.

According to this embodiment, to execute an education application, the cloud server estimates the status of a device, and proposes a coping method. This makes it possible to readily maintain ICT education while suppressing the load of device setting in the field of education.

Other Embodiments

In the aforementioned fourth embodiment, the cloud server 2110 grasps the status of a device based on a voice and video acquired and transmitted by the portable terminal 2120, generates coping information, and notifies the portable terminal 2120 of the coping information. The device connected to the portable terminal 2120, however, is adjusted more quickly and reliably by requesting, if possible, device adjustment of an expert or technician capable of adjusting the device among users around the device even if it is necessary to refer to coping information, as compared with a case in which the device is adjusted by notifying the user of coping information. To do this, a photo of the face of an expert or technician capable of adjusting the device is registered in the cloud server 2110. It is thus possible to quickly and reliably adjust the device by searching for an expert or technician based on the video of the users around the device from the portable terminal 2120, and notifying the portable terminal 2120 of the found expert or technician.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the control program installed in a computer to implement the functions of the present invention on the computer, a storage medium storing the control program, and a WWW (World Wide Web) server that causes a user to download the control program. The present invention specifically incorporates at least a non-transitory computer readable medium.

This application claims the benefit of Japanese Patent Application No. 2012-123803 filed on May 30, 2012, which is hereby incorporated by reference herein in its entirety.

The invention claimed is:

1. An information processing apparatus comprising:

a memory storing instructions; and a processor configured to execute the instructions to:

receive, from a portable terminal via a network, device information for identifying a device connected to the portable terminal;

select, based on the received device information, an application to be provided to the device; and establish communication, with exchanging data on the network and an interface of the device in a protocol of the interface of the device, between the information processing apparatus and the device, relayed by the network and the portable terminal, and provide the application to the device, relayed by the network and the portable terminal, wherein the processor is further configured to execute instructions to:

activate a set of device driver programs available on a database, access the device using the device driver programs, determine whether the device is controllable, acquire the device information, if the device is controllable, select, based on the acquired device information, an application to be provided to the device; and provide the application to the device, relayed by the network and the portable terminal.

2. The information processing apparatus according to claim 1, wherein the processor is further configured to execute the instructions to determine a belonging education group based on at least one of an ID of the device and position information of the portable terminal, and select an education application to be provided in accordance with the belonging education group.

3. The information processing apparatus according to claim 1, wherein the processor is further configured to execute the instructions to:

select a device driver program to enable the selected application to be provided to the device, and provide the selected application to the device by executing the device driver program.

4. The information processing apparatus according to claim 1, wherein the processor is further configured to execute the instructions to:

receive, from a computer including at least a display unit and via the network, computer information for identifying the computer, select, based on the computer information received, the application to be provided to the computer, and provide the application to the computer via the network.

5. An information processing apparatus comprising:

a memory storing instructions; and a processor configured to execute the instructions to:

receive, from a portable terminal via a network, device information for identifying a device connected to the portable terminal;

select, based on the device information received, an application to be provided to the device; and establish communication, with exchanging data on the network and an interface of the device in a protocol of the interface of the device, between the information processing apparatus and the device, relayed by the network and the portable terminal, and provide the application to the device, the information processing apparatus further comprising a history saving unit that saves the application, information about a providing target of the application, and information of a providing history of the application in association with each other, wherein the device information includes information about a providing target of the application, and the processor is further configured to execute the instructions to:

activate a set of device driver programs available on a database;

access the device using the device driver programs;

determine whether the device is controllable;

acquire the device information, if the device is controllable;

select, based on the acquired device information, an application to be provided to the device;

acquire a providing history of the application corresponding to the information about the providing target of the application by referring to said history saving unit, and provide the application via the network based on the acquired providing history of the application.

6. The information processing apparatus according to claim 5, wherein said history saving unit further saves the device information and adjustment data of the device in association with each other, and the processor is further configured to execute the instructions to acquire the adjustment data of the device from said history saving unit, and provide the adjustment data of the device to the device via the network.

7. An information processing apparatus comprising:

a memory storing instructions; and a processor configured to execute the instructions to:

receive, from a portable terminal via a network, device information for identifying a device connected to the portable terminal;

select, based on the device information received, an application to be provided to the device; and establish communication, with exchanging data on the network and an interface of the device in a protocol of the interface of the device, between the information processing apparatus and the device, relayed by the network and the portable terminal, and provide the application to the device, wherein the processor is further configured to execute the instructions to:

activate a set of device driver programs available on a database;

access the device using the device driver programs;

determine whether the device is controllable;

acquire the device information, if the device is controllable;

select, based on the acquired device information, an application to be provided to the device;

acquire information indicating a status of the device using a function of the portable terminal; and propose an operation of the device based on the acquired information indicating the status of the device.

8. The information processing apparatus according to claim 7, wherein the function of the portable terminal includes an image capturing function of a camera and a voice input function of a microphone, and the acquired information indicating the status of the device includes a video of the device, which has been captured by the camera, and a voice of a user around the device, which has been input by the microphone.

9. A control method for an information processing apparatus, comprising:

receiving, from a portable terminal via a network, device information for identifying a device connected to the portable terminal;

selecting, based on the device information received in the receiving, an application to be provided to the device;

establishing communication, with exchanging data on the network and an interface of the device in a protocol of the interface of the device, between the information processing apparatus and the device, relayed by the network and the portable terminal;

activating a set of device driver programs available on a database;

accessing the device using the device driver programs;

determining whether the device is controllable;

acquiring the device information, if the device is controllable;

selecting, based on the acquired device information, an application to be provided to the device; and providing the application to the device, relayed by the network and the portable terminal.

10. A non-transitory computer-readable storage medium storing a control program of an information processing apparatus for causing a computer to execute a method, comprising:

receiving, from a portable terminal via a network, device information for identifying a device connected to the portable terminal;

selecting, based on the device information received in the receiving, an application to be provided to the device;

establishing communication, with exchanging data on the network and an interface of the device in a protocol of the interface of the device, between the information processing apparatus and the device, relayed by the network and the portable terminal;

activating a set of device driver programs available on a database;

accessing the device using the device driver programs;

determining whether the device is controllable;

acquiring the device information, if the device is controllable;

selecting, based on the acquired device information, an application to be provided to the device; and providing the application to the device, relayed by the network and the portable terminal.

11. An information processing system including a portable terminal with a device connector, a device connectable to the device connector, and an information processing apparatus connected to said portable terminal via a network, said portable terminal comprising:

a first memory storing first instructions; and a first processor configured to execute the first instructions to:

transmit device information for identifying said device connected to the device connector to said information processing apparatus; and relay establishment of communication, with exchanging data on the network and an interface of the device in a protocol of the interface of the device, between the information processing apparatus and the device, and provision of an application to said device performed by said information processing apparatus based on the device information, relay control of the device by executing an application and a device driver program which are selected by the information processing apparatus based on the device information, and said information processing apparatus comprising:

a second memory storing second instructions; and a second processor configured to execute the second instructions to:

select, based on the device information, the application to be provided to said device; and establish communication, with exchanging data on the network and the interface of the device in a protocol of the interface of the device, between the information processing apparatus and the device, relayed by the network and the portable terminal, and provide the application to said device, relayed by the network and said portable terminal; and control the device by executing the application and a device driver program selected based on a determination that the device is controllable.

12. An information processing method of an information processing system including a portable terminal with a device connector, a device connectable to the device connector, and an information processing apparatus connected to the portable terminal via a network, the method comprising:

transmitting device information for identifying the device connected to the device connector from the portable terminal to the information processing apparatus;

selecting, based on the device information, an application to be provided to the device;

relaying, by the portable terminal, establishment of communication, with exchanging data on the network and an interface of the device in a protocol of the interface of the device, between the information processing apparatus and the device, and provision of the application to the device performed by the information processing apparatus based on the device information;

providing the application to the device, with exchanging data on the network and the interface of the device in the protocol of the interface of the device, relayed by the network and the portable terminal, wherein, the network and portable terminal relay control of the device by executing an application and a device driver program which are selected by the information processing apparatus based on the device information;

activating a set of device driver programs available on a database;

accessing the device using the device driver programs;

determining whether the device is controllable;

acquiring the device information, if the device is controllable; and selecting, based on the acquired device information, an application to be provided to the device.

13. An information processing apparatus comprising:

a memory storing instructions; and a processor configured to execute the instructions to:

receive, from a portable terminal via a network, device information for identifying a device connected to the portable terminal;

select, based on the received device information, an application to be provided to the device; and provide the application to the device, relayed by the network and the portable terminal, wherein the processor is configured to execute the instructions to, when receiving a request from the portable terminal to control the device, establish communication, with exchanging data on the network and an interface of the device in a protocol of the interface of the device, between the information processing apparatus and the device, relayed by the network and the portable terminal, and receive the device information from the device, activate a set of device driver programs available on a database, access the device using the device driver programs, determine whether the device is controllable, acquire the device information, if the device is controllable, and select, based on the acquired device information, an application to be provided to the device.

* * * * *